US010088312B2

(12) United States Patent
Gutt et al.

(10) Patent No.: US 10,088,312 B2
(45) Date of Patent: *Oct. 2, 2018

(54) GEOLOCATION USING ACQUISITION SIGNALS

(71) Applicant: THE BOEING COMPANY, Chicago, IL (US)

(72) Inventors: Gregory M. Gutt, Ashburn, VA (US); David G. Lawrence, Santa Clara, CA (US); David A. Whelan, Newport Coast, CA (US); Michael Lee O'Connor, Redwood City, CA (US)

(73) Assignee: The Boeing Company, Chicago, IL (US)

(*) Notice: Subject to any disclaimer, the term of this patent is extended or adjusted under 35 U.S.C. 154(b) by 684 days.

This patent is subject to a terminal disclaimer.

(21) Appl. No.: 13/791,662

(22) Filed: Mar. 8, 2013

(65) Prior Publication Data

US 2013/0197860 A1 Aug. 1, 2013

Related U.S. Application Data

(63) Continuation-in-part of application No. 12/756,961, filed on Apr. 8, 2010, now Pat. No. 9,625,573.

(51) Int. Cl.
*G01C 15/00* (2006.01)
*G01S 19/38* (2010.01)
*G01S 5/02* (2010.01)

(52) U.S. Cl.
CPC ............... *G01C 15/00* (2013.01); *G01S 5/02* (2013.01); *G01S 19/38* (2013.01)

(58) Field of Classification Search
CPC . H04B 7/00; H04B 7/02; H04B 7/028; H04B 7/0404; H04B 7/0408; G01C 21/00;
(Continued)

(56) References Cited

U.S. PATENT DOCUMENTS

| 7,042,392 B2 | 5/2006 | Whelan et al. |
| 7,372,400 B2 | 5/2008 | Cohen et al. |

(Continued)

FOREIGN PATENT DOCUMENTS

| CN | 102047137 A | 5/2011 |
| CN | 102256353 | 11/2011 |

(Continued)

OTHER PUBLICATIONS

International Search Report, International Application No. PCT/US2014/015599, dated May 12, 2014.
(Continued)

*Primary Examiner* — Sujoy Kundu
*Assistant Examiner* — Lynda Dinh
(74) *Attorney, Agent, or Firm* — Haynes and Boone, LLP

(57) ABSTRACT

A method and system are disclosed for providing an estimate of a location of a user receiver device. The method involves emitting, from at least one vehicle, at least one spot beam on Earth; and receiving, with the user receiver device, at least one spot beam. The method further involves calculating, with the user receiver device, the estimate of the location of the user receiver device according to the user receiver device's location within at least one spot beam. Each spot beam contains at least one acquisition signal, which may comprise at least one ring channel. Each ring channel comprises a frame count; a space vehicle identification (SVID); a spot beam identification (ID); and/or X, Y, Z coordinates of the vehicle emitting the spot beam relative to an Earth coordinate system. In one or more embodiments, at least one vehicle may be a satellite and/or a pseudolite.

22 Claims, 15 Drawing Sheets

(58) Field of Classification Search
CPC .......... G01C 21/04; G01C 5/00; G01C 15/00; G01S 19/42; G01S 19/428; G01S 5/02; G01S 10/38
USPC ................................................ 702/150, 152
See application file for complete search history.

(56) References Cited

U.S. PATENT DOCUMENTS

| | | |
|---|---|---|
| 7,468,696 B2 | 12/2008 | Bornholdt |
| 7,489,926 B2 | 2/2009 | Whelan et al. |
| 7,554,481 B2 | 6/2009 | Cohen et al. |
| 7,579,986 B2 | 8/2009 | DiEsposti |
| 7,579,987 B2 | 8/2009 | Cohen et al. |
| 7,583,225 B2 | 9/2009 | Cohen et al. |
| 7,619,559 B2 | 11/2009 | DiEsposti |
| 7,688,261 B2 | 3/2010 | DiEsposti |
| 2005/0159891 A1 | 7/2005 | Cohen et al. |
| 2007/0046537 A1* | 3/2007 | Tekawy ................... G01S 19/02 342/358 |
| 2007/0216575 A1* | 9/2007 | DiEsposti ............. G01S 19/252 342/357.64 |
| 2008/0001819 A1* | 1/2008 | Cohen ................. H04B 7/1853 342/357.44 |
| 2008/0059059 A1 | 5/2008 | Cohen et al. |
| 2008/0143605 A1 | 6/2008 | Bornholdt |
| 2008/0146246 A1 | 6/2008 | Bornholdt |
| 2009/0174597 A1 | 7/2009 | DeLellio et al. |
| 2009/0228210 A1 | 9/2009 | Gutt |
| 2009/0315764 A1 | 12/2009 | Cohen et al. |
| 2009/0315769 A1 | 12/2009 | Whelan et al. |
| 2010/0171652 A1 | 7/2010 | Gutt et al. |
| 2011/0248887 A1 | 10/2011 | Whelan et al. |
| 2012/0218147 A1 | 8/2012 | Whelan et al. |

FOREIGN PATENT DOCUMENTS

| | | |
|---|---|---|
| CN | 102859901 A | 1/2013 |
| JP | H06-160508 | 6/1994 |
| JP | H06-237210 | 8/1994 |
| WO | 9812571 A1 | 3/1998 |
| WO | WO 01/006678 | 1/2001 |

OTHER PUBLICATIONS

Notification of the First Office Action dated Dec. 28, 2016 in Chinese Patent Application No. 2014800131326 (18pages).

* cited by examiner

| Channel Number | Center Frequency (MHz) | Allocation |
| --- | --- | --- |
| 1 | 1626.020833 | Guard Channel |
| 2 | 1626.062500 | Guard Channel |
| 3 | 1626.104167 | Quaternary Messaging |
| 4 | 1626.145833 | Tertiary Messaging |
| 5 | 1626.187500 | Guard Channel |
| 6 | 1626.229167 | Guard Channel |
| 7 | 1626.270833 | Ring Alert |
| 8 | 1626.312500 | Guard Channel |
| 9 | 1626.354167 | Guard Channel |
| 10 | 1626.395833 | Secondary Messaging |
| 11 | 1626.437500 | Primary Messaging |
| 12 | 1626.479167 | Guard Channel |

- LBFC = 485215784
- svId = 34
- beamId = 6
- xCoord = 127 (4km)
- yCoord = -1140 (4km)
- zCoord = 1102 (4km)

GEOLOCATION USING ACQUISITION SIGNALS

CROSS-REFERENCE TO RELATED APPLICATION

This application is a Continuation-In-Part application of, and claims the benefit of, U.S. patent application Ser. No. 12/756,961, filed Apr. 8, 2010, which is hereby incorporated by reference in its entirety.

BACKGROUND

The present disclosure relates to using spot beam overlap for geolocation. In particular, it relates to using spot beams to obtain precise positioning that maintains a high enough accuracy to be used for time transfer. Specifically, the spot beams utilize at least one acquisition signal, which is used for assisting in geolocation.

Currently, navigation and timing signals provided by various existing satellite navigation systems often do not provide satisfactory system performance. In particular, the signal power and bandwidth of such navigation and timing signals are generally insufficient to meet the needs of many demanding usage scenarios. For example, existing navigation and timing approaches based on global positioning system (GPS) signals may not typically be available to a navigation user in many instances. During operation, a GPS receiver must typically receive at least four simultaneous ranging sources in order to permit three-dimensional (3D) positioning and accurate time transfer. However, GPS signals often provide insufficient, low-signal power or geometry to readily penetrate urban canyons or walls of buildings. When this occurs, a GPS receiver will not be able to receive the signals it requires for accurate 3D positioning and time transfer. In another example, navigational approaches based on cellular telephone or television signals also do not provide satisfactory system performance. This is because their signals typically lack vertical navigation information, which is desired for many navigational usage scenarios.

Existing navigation systems have attempted to address indoor navigation deficiencies by the use of various approaches. Some of these various approaches include the use of inertial navigation systems, specialized beacons, and highly sensitive GPS systems. However, it should be noted that each of these approaches has their own unique drawbacks. Inertial navigation systems drift and can be expensive. Beacons require specialized fixed assets that need to be surveyed, can be expensive, and are not standardized. As such, beacons are built to only have a specialized utility. And, sensitive GPS systems often do not perform to user expectations due to the weakness of the GPS signals in indoor environments. The disclosed systems and methods are able to provide an improvement in navigation system performance when the user receiver device is located in an attenuated environment, a jammed environment, and/or an occluded environment, such as indoors.

SUMMARY

The present disclosure relates to a system, apparatus, and method for using spot beam overlap for geolocation. In one or more embodiments, the method for using spot beam overlap for geolocation involves providing an estimate of a location of a user receiver device. The method comprises emitting from at least one vehicle at least one spot beam on Earth, and receiving with the user receiver device a signal from at least one spot beam. The method further comprises calculating with the user receiver device an estimate of the location of the user receiver device according to the user receiver device's location within at least one spot beam.

In one or more embodiments, the method further comprises calculating a range from at least one vehicle to the surface of the Earth. In some embodiments, the method further comprises calculating a range from at least one vehicle to the user receiver device. In at least one embodiment, the calculating of the range from at least one vehicle to the user receiver device involves measuring a doppler frequency offset of at least one vehicle, calculating a doppler range estimate and/or pseudorange measurements using a Kalman filter, and calculating a running estimate of the range from at least one vehicle to the user receiver device.

In some embodiments of the present disclosure, the method for using spot beam overlap for geolocation provides an improvement in accuracy of geolocation algorithms. In one or more embodiments, the user receiver device is located in an attenuated environment, a jammed environment, and/or an occluded environment. In at least one embodiment, the occluded environment is indoors. In some embodiments, the method for using spot beam overlap for geolocation further involves using signal to noise ratio (SNR) measurements from at least one vehicle in order to further refine the estimate of the location of the user receiver device.

In one or more embodiments, at least one vehicle of the present disclosure is a satellite, a pseudolite, a space shuttle, an aircraft, a balloon, and/or a helicopter. In alternative embodiments, various other types of vehicles may be employed for at least one vehicle of the present disclosure. In some embodiments, the types of aircrafts that may be used include, but are not limited to, airplanes and/or unmanned aerial vehicles (UAVs). In at least one embodiment, the types of satellites that may be employed for the present disclosure include, but are not limited to, low earth orbit (LEO) satellites, medium earth orbit (MEO) satellites, and/or geostationary earth orbit (GEO) satellites. In some embodiments, at least one vehicle has a known orbit and/or a known path. In one or more embodiments, the user receiver device is mobile and/or stationary.

In some embodiments, the method involves at least one vehicle emitting at least one spot beam with at least one radio frequency (RF) antenna. In at least one embodiment, at least one spot beam is radiated from at least one RF antenna as a fixed position beam. In other embodiments, at least one spot beam is radiated from at least one RF antenna as a scanning beam. In some embodiments, the user receiver device receives the signal from at least one spot beam with at least one RF antenna.

In one or more embodiments, the user receiver device uses a processor to calculate the estimate of the location of the user receiver device. In some embodiments, when the user receiver device receives a signal from only one spot beam, the user receiver device calculates the estimate of the location of the user receiver device to be located in the center of the intersection of the one spot beam. In at least one embodiment, when the user receiver device receives signals from at least two spot beams, the user receiver device calculates the estimate of the location of the user receiver device to be located in the center of the intersection of at least two spot beams. In other embodiments, when the user receiver device receives signals from at least two spot beams, the user receiver device calculates the estimate of the location of the user receiver device to be located at a centroid of the centers of at least two spot beams.

In some embodiments, the user receiver device of the present disclosure records a spot beam position as being from the time the spot beam rises ($t_{RISE}$) to the time the spot beam sets ($t_{SET}$). In one or more embodiments, when the mask angles are uniform in all directions with respect to the user receiver device, it is assumed that at time=(($t_{SET}-t_{RISE}$)/2), the user receiver device is located at the center of the spot beam in the in-track direction. Alternatively, when the mask angles are non-uniform in a spot beam rise direction and a spot beam set direction, it is assumed that at time=(($\Delta t_{True}$)/2), where ($\Delta t_{True}$)/2=($\Delta t_{RcverMeasured}+\Delta t_{\beta Bias}$)/2, the user receiver device is located at the center of the spot beam in the in-track direction.

In one or more embodiments, the user receiver device uses the received amplitude of at least one spot beam to calculate the estimate of the location of the user receiver device. In one or more embodiments, the user receiver device averages two or more estimates of the location of the user receiver device that were calculated over time in order to further refine the estimate of the location of the user receiver device.

In some embodiments, the user receiver device uses a Kalman filter in order to average two or more estimates of the location of the user receiver device. In alternative embodiments, the user receiver device uses a matched filter in order to average two or more estimates of the location of the user receiver device. In one or more embodiments, the estimate of the location of the user receiver is used by a global positioning system (GPS) in order to assist in rapidly acquiring the GPS signal.

In one or more embodiments, the system for using spot beam overlap for geolocation leveraging involves providing an estimate of a location of a user receiver device. The system comprises at least one vehicle and a user receiver device. In some embodiments, at least one vehicle emits at least one spot beam on Earth. In at least one embodiment, the user receiver device includes at least one RF antenna and a processor. In one or more embodiments, at least one RF antenna receives at least one spot beam. In some embodiments, the processor calculates the estimate of the location of the user receiver device according to the user receiver device's location within at least one spot beam.

In some embodiments, the user receiver device further includes a local clock and memory. The memory is adapted to store successive spot beam identifying information that is recorded over time. Also, the processor of the user receiver device is able to calculate the doppler frequency offset of at least one vehicle.

In at least one embodiment, the user receiver device further includes an internal orbital model. In some embodiments, the user receiver device receives orbital data information via transmissions from at least one vehicle. In other embodiments, the user receiver device receives orbital delta correction information via transmissions from at least one vehicle and/or from an earth based network. In at least one embodiment of the present disclosure, the earth based network is a cellular network.

In one or more embodiments, a method of providing an estimate of a location of a user receiver device involves emitting, from at least one vehicle, at least one spot beam on Earth. In at least one embodiment, at least one spot beam comprises at least one acquisition signal. The method further involves receiving, with the user receiver device, at least one spot beam. Further, the method involves calculating, by the user receiver device, the estimate of the location of the user receiver device according to the user receiver device's location within at least one spot beam.

In at least one embodiment, at least one acquisition signal comprises at least one ring channel. In some embodiments, at least one ring channel comprises a frame count; a space vehicle identification (SVID); a spot beam identification (ID); and/or X, Y, Z coordinates of the at least one vehicle relative to an Earth coordinate system.

In one or more embodiments, the method further involves calculating, by the user receiver device, a time from at least one vehicle's clock by using the frame count. In some embodiments, the method further involves calculating, by the user receiver device, a range from at least one vehicle to the user receiver device by using a difference between the time from at least one vehicle's clock and a time from the user receiver device's clock. In at least one embodiment, the method further involves refining, by the user receiver device, the estimate of the location of the user receiver device by using the range and the X, Y, Z coordinates of at least one vehicle.

In at least one embodiment, at least one vehicle is a satellite, a pseudolite, a space shuttle, an aircraft, an airplane, an unmanned aerial vehicle (UAV), a balloon, and/or a helicopter. In some embodiments, at least one satellite is a low earth orbit (LEO) satellite, a medium earth orbit (MEO) satellite, and/or a geostationary earth orbit (GEO) satellite.

In one or more embodiments, at least one spot beam is radiated as a fixed position beam. In at least one embodiment, at least one spot beam is radiated as a scanning beam. In some embodiments, the user receiver device uses a processor to calculate the estimate of the location of the user receiver device. In one or more embodiments, the user receiver device uses an amplitude of at least one spot beam to calculate the estimate of the location of the user receiver device.

In at least one embodiment, a system for providing an estimate of a location of a user receiver device includes at least one vehicle, where at least one vehicle emits at least one spot beam on Earth. In one or more embodiments, at least one spot beam comprises at least one acquisition signal. The system further includes the user receiver device. In at least one embodiment, the user receiver device includes at least one radio frequency (RF) antenna, where at least one RF antenna receives at least one spot beam. In some embodiments, the user receiver device additionally includes a processor, where the processor calculates the estimate of the location of the user receiver device according to the user receiver device's location within at least one spot beam.

In one or more embodiments, the processor further calculates a time from at least one vehicle's clock by using the frame count. In some embodiments, the processor further calculates a range from at least one vehicle to the user receiver device by using a difference between the time from at least one vehicle's clock and a time from the user receiver device's clock. In at least one embodiment, the processor further refines the estimate of the location of the user receiver device by using the range and the X, Y, Z coordinates of the at least one vehicle.

In at least one embodiment, the processor uses an amplitude of at least one spot beam to calculate the estimate of the location of the user receiver device. In one or more embodiments, the user receiver device further includes a local clock, and memory, where the memory is adapted to store successive spot beam identifying information that is recorded over time.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

Figure 10:
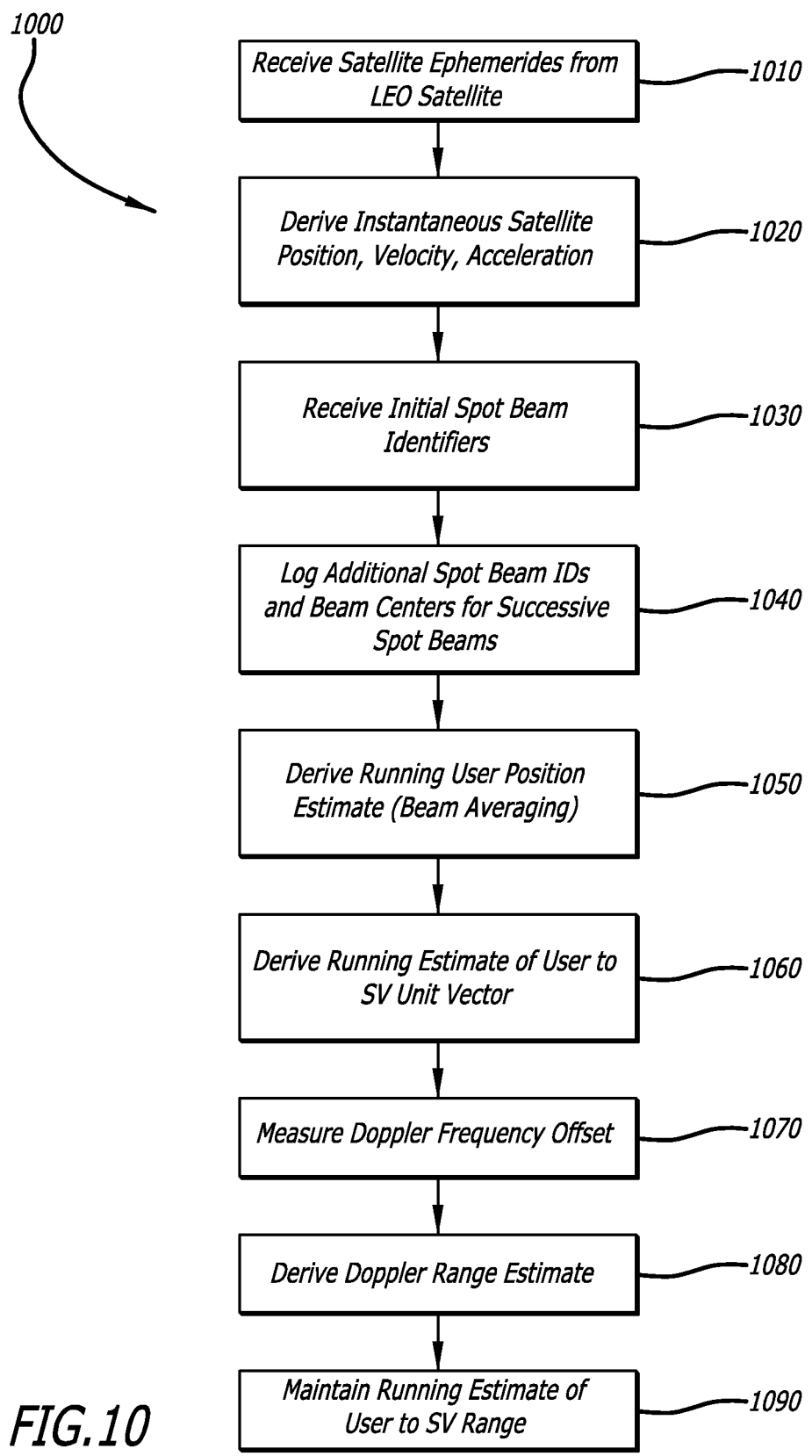

FIG. 10 provides a flow diagram illustrating a method of obtaining a running estimate of the range between a user receiver device and a satellite, in accordance with at least one embodiment of the present disclosure.

Figure 11:
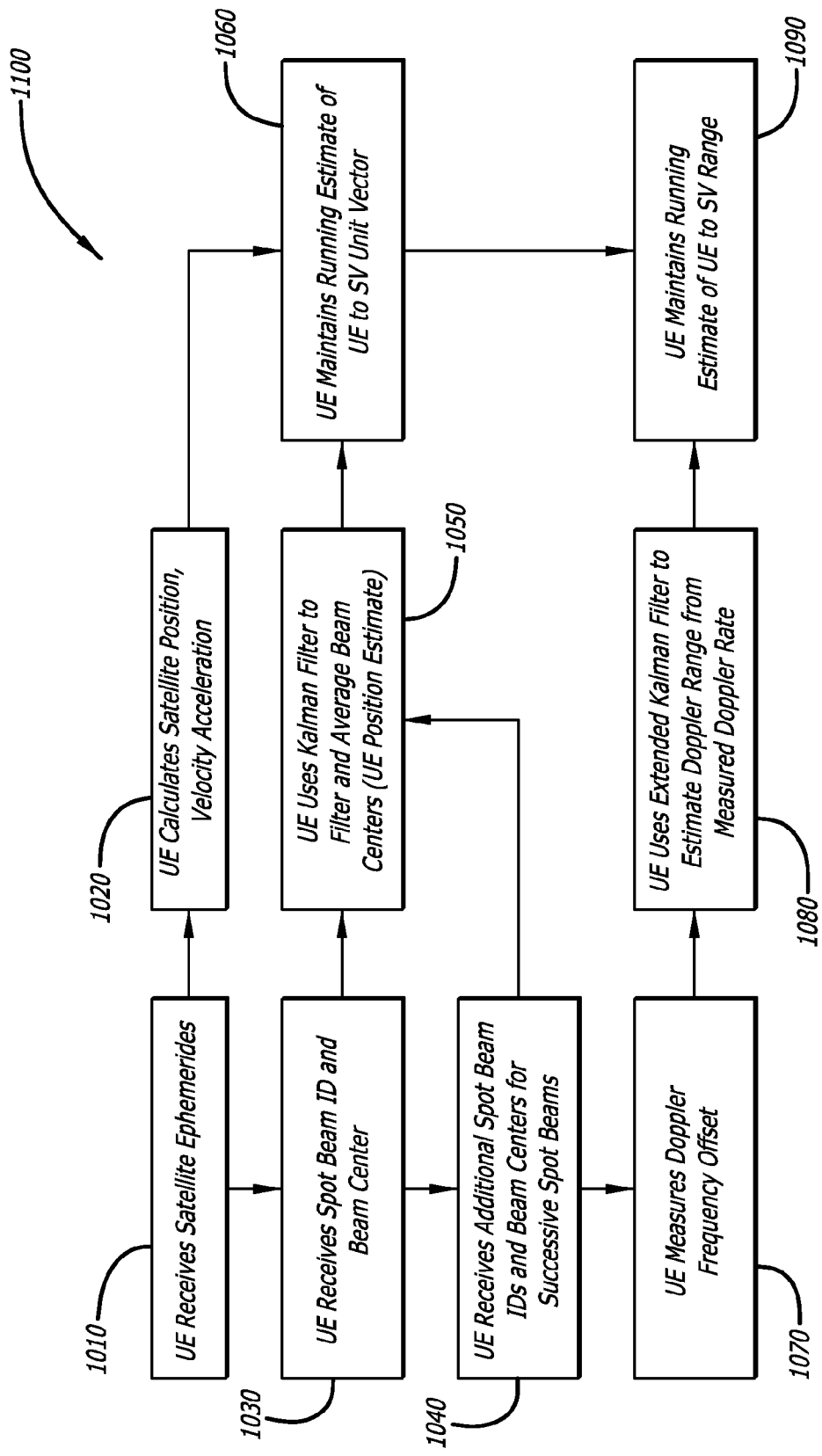

FIG. 11 shows a flow diagram illustrating another method of obtaining a running estimate of the range between a user receiver device and a satellite, in accordance with at least one embodiment of the present disclosure.

Figure 12:
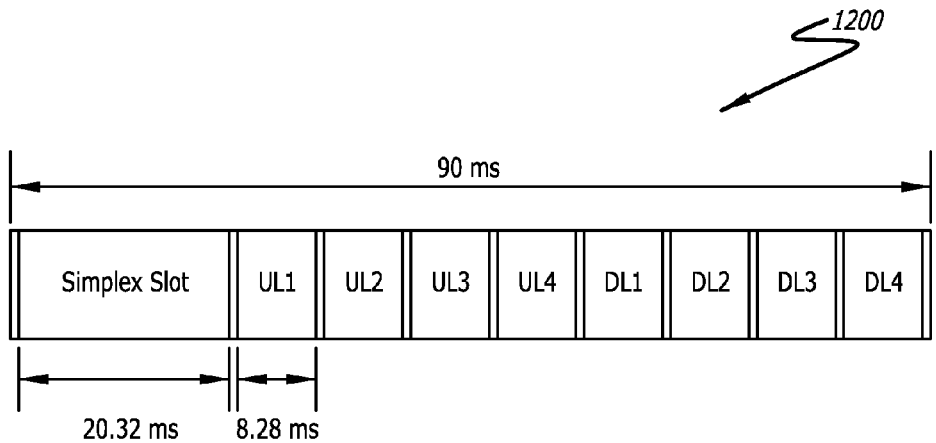

FIG. 12 illustrates a time interval that includes a simplex time slot (which supports an exemplary Iridium ring channel) and other time slots, in accordance with at least one embodiment of the present disclosure.

Figure 13:
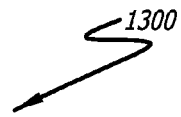

FIG. 13 provides a table containing exemplary frequency allocation for the channels (e.g., the ring channel and the messaging channels) of the simplex time slot of FIG. 12, in accordance with at least one embodiment of the present disclosure.

Figure 14:
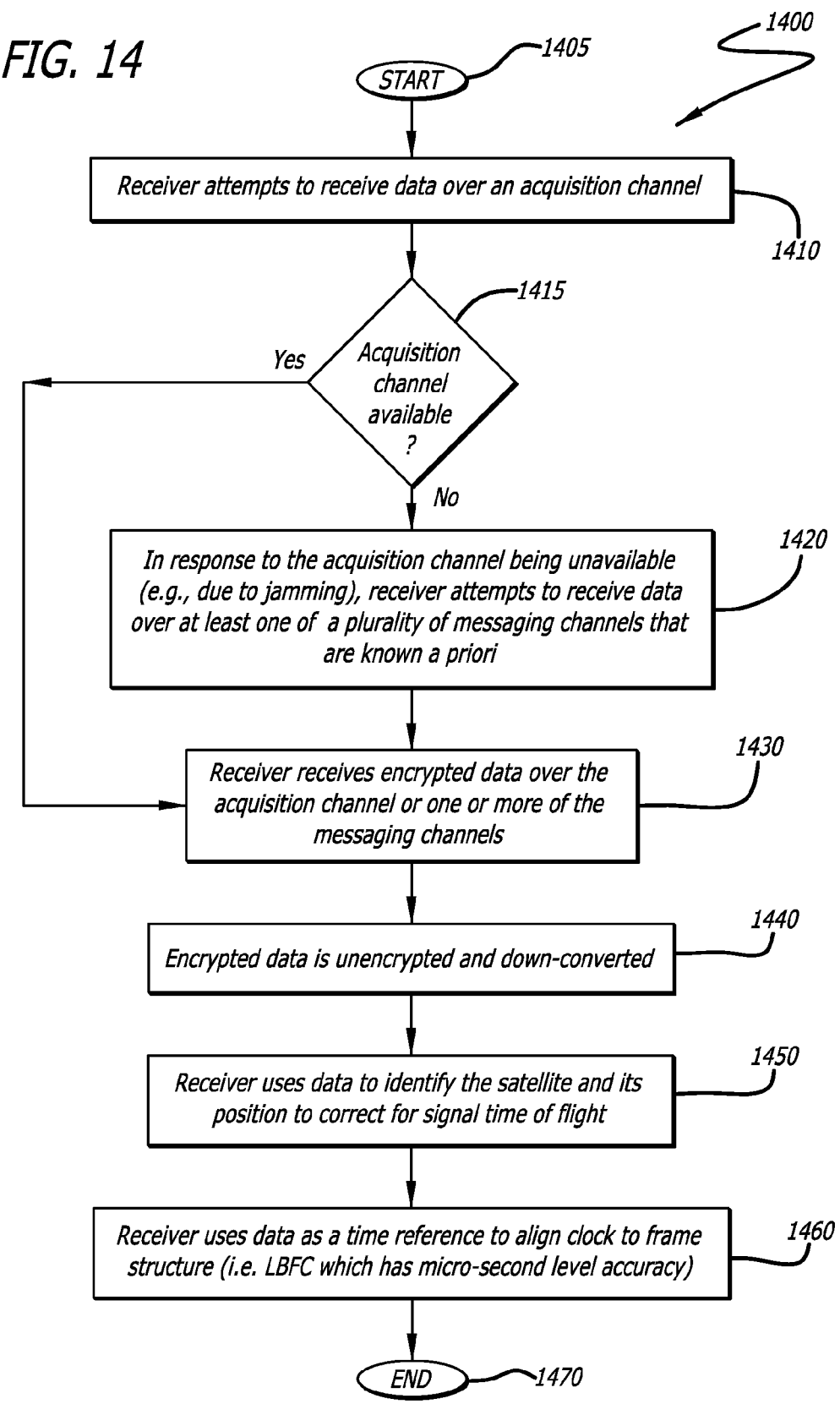

FIG. 14 provides a flow diagram of a method for initiating a receiver for obtaining precise absolute time from a satellite by using the exemplary Iridium ring channel of FIG. 12, in accordance with at least one embodiment of the present disclosure.

Figures 15, 16:
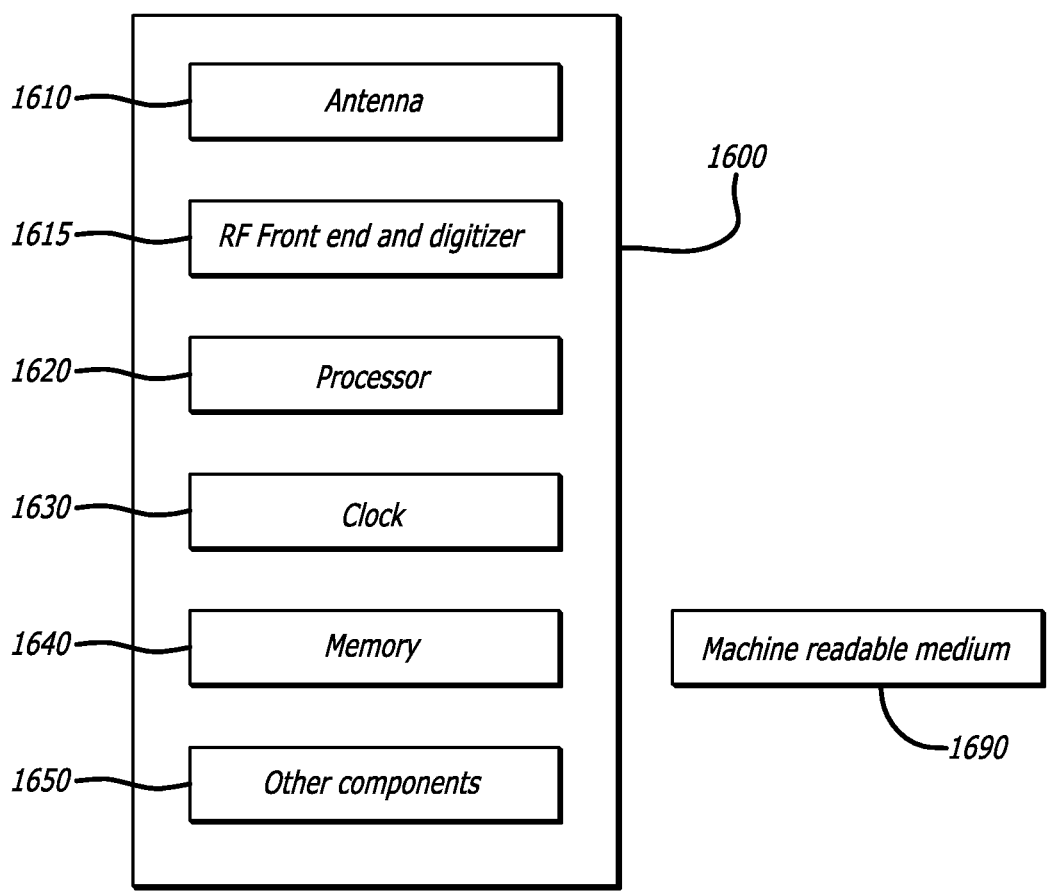

FIG. 15 shows an exemplary ring message contained in the simplex time slot of FIG. 12, in accordance with at least one embodiment of the present disclosure.

FIG. 16 depicts a block diagram illustrating various exemplary components employed by the disclosed user receiver device, in accordance with at least one embodiment of the present disclosure.

DESCRIPTION

The methods and apparatus disclosed herein provide an operative system for using spot beam overlap for geolocation. Specifically, this system relates to using spot beams in order to obtain precise positioning that maintains a high enough accuracy to be used for time transfer. In particular, in one or more embodiments, the spot beams utilize at least one acquisition signal (e.g., an Iridium ring channel), which is used for assisting in geolocation.

The systems and methods of the present disclosure allow for determining an estimate of the location of a user receiver device on or near the surface of the Earth based on the knowledge of a satellite's directional signals (i.e. spot beams) in which the user receiver device is located within. By utilizing the knowledge of the uniquely-identifiable spot beam geometry, such as that from an Iridium low earth orbiting (LEO) satellite, the user receiver device is able to discern which set of satellite spot beams the user receiver device is located within at any given period of time. The simplest approximation of the user receiver device's location is the calculation of the projection of the center of the spot beam on the surface of the Earth, which statistically holds the highest likelihood of being the user receiver device's true location. This first order approximated user receiver device location estimate combined with the known satellite position, as derived by the user receiver device, can be used to estimate the user receiver device-to-satellite unit vector.

The system of the present disclosure employs a method referred to as beam averaging, which includes various embodiments in order to estimate the user receiver device's location, and subsequently refine the estimate with additional measurements. After a first order location estimate is developed from a single spot beam, the estimate can be refined by monitoring successive spot beams sweeping over the user receiver device as time progresses. When there is a situation of a user receiver device being located within the intersection of two or more spot beams, the user receiver device's location can be estimated to be at the center of the intersection of the spot beams.

During a given duration of time, the user receiver device will likely be located within multiple overlapping spot beams from a single satellite or multiple satellites. The location of the user receiver device can be estimated to be at the centroid of the centers of the multiple overlapping spot beams. Additionally, two or more successive user receiver device location estimates can be averaged over time in order to further reduce the user receiver device's location error. Satellites transmitting a greater number of spot beams per unit area will provide a more accurate user receiver device estimate. By carefully recording which beams are overlapping and how the overlap changes with respect to time, the accuracy of geolocation algorithms and satellite ranging predictions can be significantly improved. In at least one embodiment, a single spot beam's rising and setting times are tracked, and the location of the user receiver device is estimated to be at a position within the spot beam that corresponds to being half-way between the spot beam rise and set times as determined by the user receiver device.

In one or more embodiments, the disclosed systems and methods obtain an estimate of the position of a user receiver device that is located on or near the surface of the Earth by using knowledge of at least one non-geostationary vehicle's directional signals (i.e. spot beams) in which the receiver is located within. A particular type of non-geostationary vehicles that may be employed by the present disclosure is exemplified by the Iridium satellite constellation, which are low-earth orbiting (LEO), 3-axis stabilized, earth-pointing satellites that transmit signals towards the Earth in a known deterministic antenna spot beam pattern. For any given satellite, if at any time $t_1$, the position and attitude of the satellite relative to the Earth are known, and if the directions of the transmitted antenna spot beams relative to the satellite are known, then the intersection of the center of the spot beams on the surface of the Earth at time $t_1$ can be calculated. Further, if the properties of the antenna spot beams are well known, then the pattern of the projections of the antenna spot beams on the Earth's surface at time $t_1$ can be calculated. This is well-known to persons who are versed in the art. As in the Iridium satellite constellation example, it is possible for the satellite to transmit the spot beam center location to the user receiver device in a defined coordinate system.

By utilizing knowledge of the uniquely-identifiable spot beam geometry, the user receiver device, which detects at least one spot beam signal, is able to discern which set of satellites and spot beams that the user receiver device is located within at a given time $t_1$. For example, part of the received signal may identify the specific spot beam identification number. Once the spot beam in which the user receiver device is located within is determined, the user receiver device can make the determination that it is at a location within the projection of the spot beam. Then, once the user receiver device calculates the location of the projection of the spot beam at time $t_1$, the user receiver device can calculate an estimate of its own location at time $t_1$. The accuracy of this measurement will depend on the size of the projection of the given spot beam on the surface of the Earth. Vehicles transmitting a greater number of spot beams per vehicle will provide a more accurate position estimate. As will be easily understood, the accuracy of such a system will be a function of the size and number of the spot beam projections on or near the surface of the Earth. As such, the accuracy of the system may be improved by increasing the number of spot beams and decreasing the radius of the spot beams (i.e. focusing the spot beams) on the surface of the Earth.

It should be noted that the systems and methods of the present disclosure may employ any various type of overhead vehicles as a transmission source for the spot beams. Types of vehicles that may be employed for the system of the present disclosure include, but are not limited to, a satellite, a pseudolite, a space shuttle, an aircraft, an airplane, an unmanned aerial vehicle (UAV), a balloon, and/or a helicopter. In addition, various types of satellites may be used for the vehicles of the disclosed system include, but not limited to, low earth orbiting (LEO) satellites, medium earth orbit (MEO) satellites, and/or geostationary earth orbit (GEO) satellites. When employing vehicles that are not satellites, virtually no changes are required to the disclosed system so long as the spot beam geometry is known by the user receiver device and is well defined. Also, in one or more embodiments for the system of the present disclosure, at least one vehicle has a known orbit and/or a known path.

As previously mentioned, the present disclosure teaches a method and system for providing an estimate of a location of a user receiver device. In particular, in one or more embodiments, specially-designed signals are emitted from at least one vehicle (e.g., a satellite), in at least one spot beam, to Earth. A user receiver device, located at or near the Earth's surface, receives the signals from at least one spot beam. The receiver device calculates an estimate of the location of the user receiver device according to the device's location within at least one spot beam, or within the intersection of at least two spot beams. To augment the capabilities and robustness of the disclosed method and system, it should be noted that in one or more embodiments, an additional type of transmission, an acquisition channel, may be employed to provide a signal that can be used to derive an estimate of the location of the user receiver device. As such, for these embodiments, an acquisition channel is used as a signal for geolocation instead of the specially-designed signals, which are meant for providing data for estimation of the location of the user receiver device. The use of the acquisition channel for geolocation allows for an increase in accuracy and speed of the resulting user receiver device positioning data.

In one or more embodiments, a user receiver device(s) may utilize a known frequency, referred to as the acquisition channel, to acquire a signal in space. The acquisition channel may use a known frequency that is held constant globally so that users around the world can universally access it. The acquisition channel may be a downlink channel that provides alerts to the user receiver devices. Types of alerts include, but are not limited to, the frequency for the user receiver device to access in order to properly initialize the user receiver device, the frequency for the user receiver device to access to enable channel acquisition, and the frequency for the user receiver device to use for a hand-off.

For example, in one or more embodiments, the ring channel of the Iridium Satellite system may be used for the acquisition channel. In the Iridium Satellite system, the acquisition channel (referred to as the ring channel or ring alert channel) is one of twelve frequency access bands reserved for the simplex time slots. These channels are located in a globally allocated 500 kilohertz (kHz) band between 1626.0 megahertz (MHz) and 1626.5 MHz. These frequency access bands may be used only for downlink signals, and may be the only frequencies that may be transmitted during the simplex time slot. The ring channel is normally assigned to channel seven (7) at 1626.270833 MHz, and transmits a data signal that includes L-band frames, from which a precise absolute time is available for a receiver user device.

A typical ring message, when decoded, may contain information, such as the following: L-Band Frame Count (LBFC), Space Vehicle Identification (SVID), Spot Beam Identification (ID), and Satellite X, Y, Z Coordinates.

Iridium burst sequences occur every 90 milliseconds in an L-band frame and, thus, the LBFC number is effectively a clock with microsecond accuracy. Because the edge of the L-band frame (and thus the LBFC) is accurate at the microsecond level, the ring message acts like and can be used as a very accurate clock that ticks every 90 milliseconds. Meanwhile, the SVID may be used to understand which satellite is relaying the information in the message, and the Spot Beam ID number may be used by the receiver user device in geolocation applications to identify the spot beam. The X, Y, and Z coordinates are the coordinates for the satellite's position, and may be used for geolocation and to correct the time of flight of the signal from the space vehicle (i.e. the satellite) to the receiver user device.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1A:
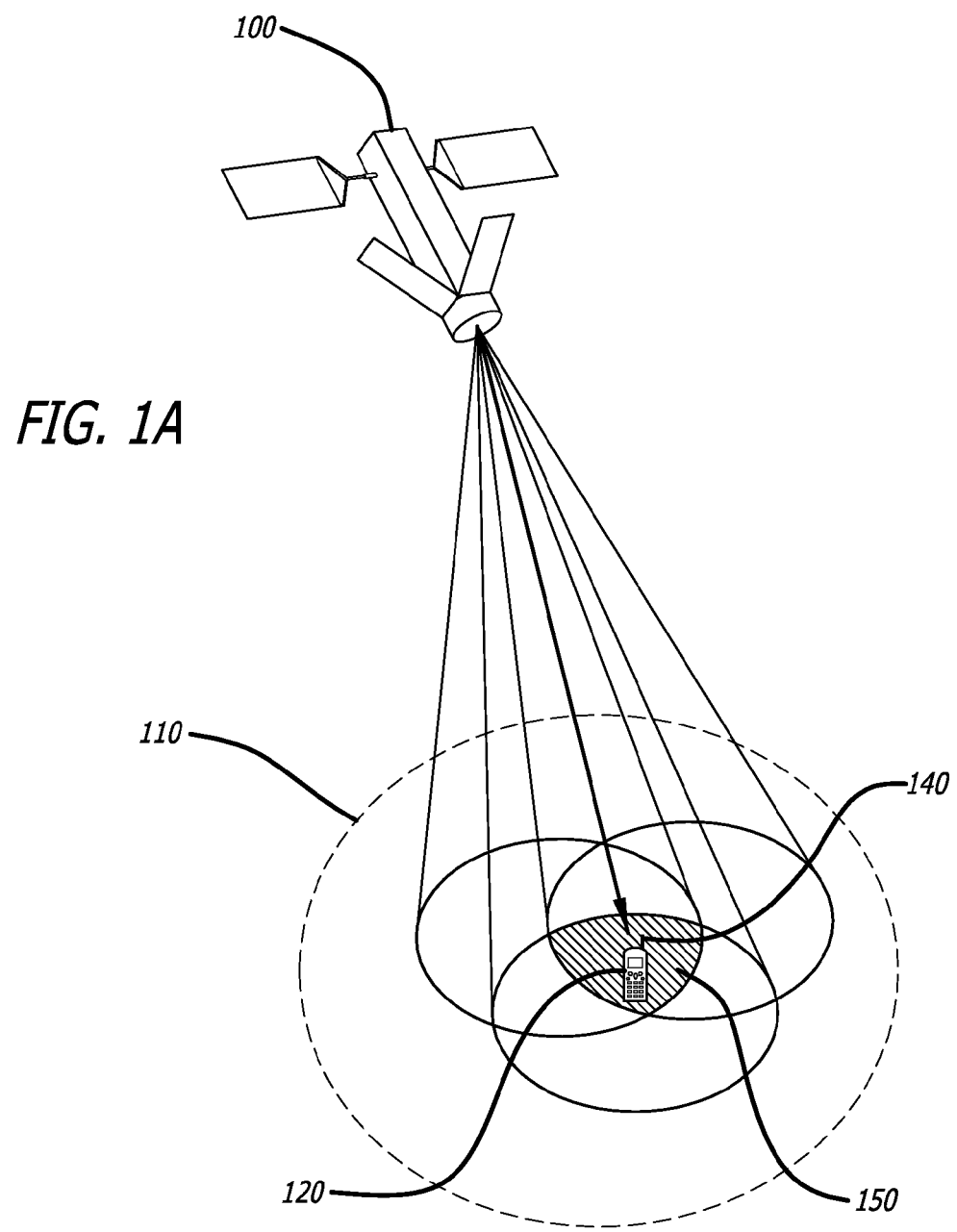
FIG. 1A illustrates the use of a single satellite's overlapping multiple spot beams in order to obtain an estimate of the location of a user receiver device, in accordance with at least one embodiment of the present disclosure.
Figure 1B:
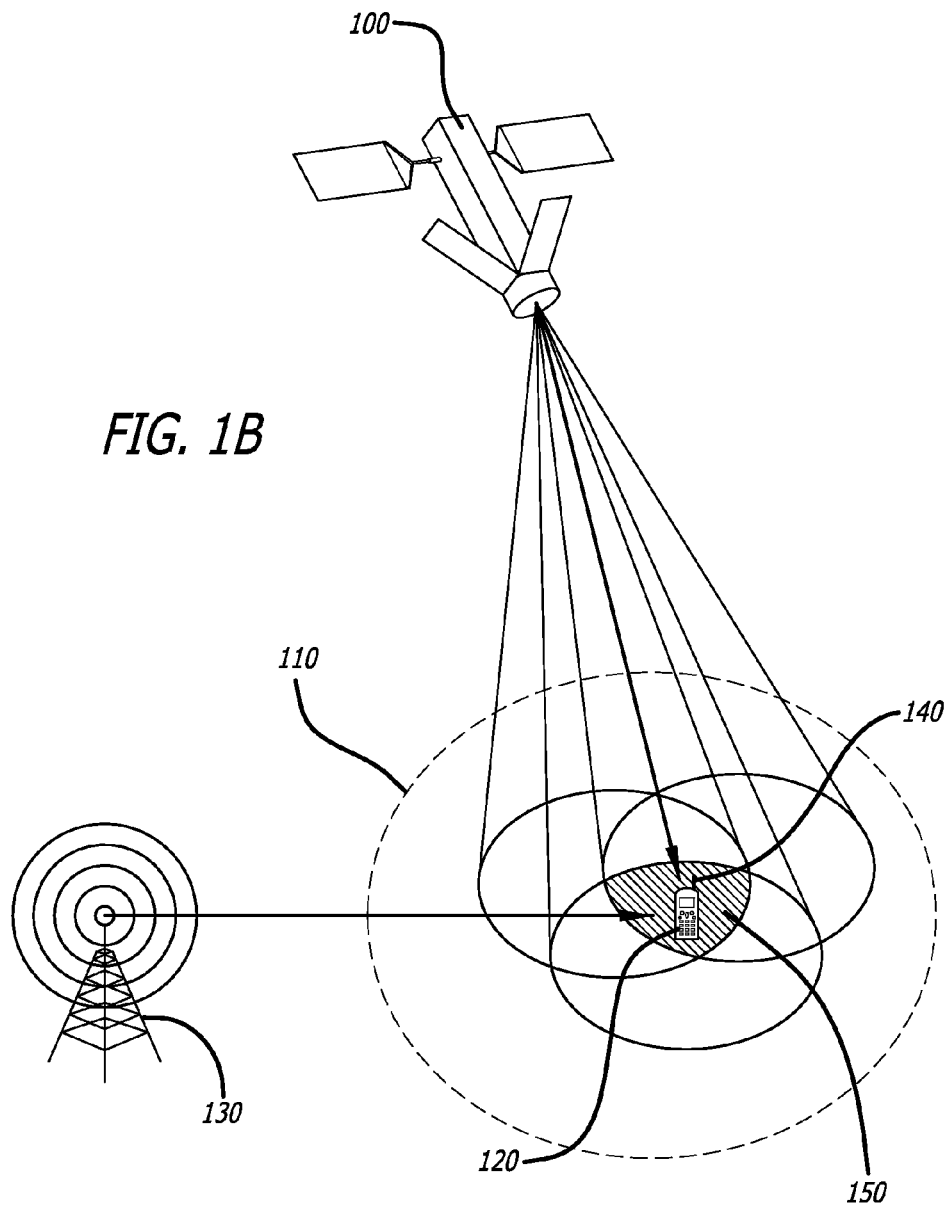
FIG. 1B shows the use of a single satellite's overlapping multiple spot beams along with a cellular network in order to obtain an estimate of the location of a user receiver device, in accordance with at least one embodiment of the present disclosure.

FIG. 1A illustrates the use of a single satellite's 100 overlapping multiple spot beams 110 in order to obtain an estimate of the location of a user receiver device 120, in accordance with at least one embodiment of the present disclosure. And, FIG. 1B shows the use of a single satellite's 100 overlapping multiple spot beams 110 along with the use of a cellular network 130 in order to obtain an estimate of the location of a user receiver device 120, in accordance with at least one embodiment of the present disclosure. FIG. 1B is similar to FIG. 1A except for the fact that FIG. 1B employs the use of a cellular network 130. In both of these figures, it can be seen that the single satellite 100 emits at least one spot beam 110 on Earth. In one or more embodiments, the satellite 100 uses at least one radio frequency (RF) antenna to emit at least one of the spot beams 110. The user receiver device 120 receives a signal from at least one of the projected spot beams 110. The user receiver device 120 then calculates an estimate of its location on Earth according to its location within one of the projected spot beams 110.

In FIGS. 1A and 1B, the user receiver device 120 calculates the location of at least one spot beam that the user receiver device 120 is located within. In order to make this calculation, the user receiver device 120 uses knowledge of the satellite 100 position, knowledge of the satellite 100 attitude, and/or knowledge of the direction and/or pattern of the spot beams 110. In some embodiments, in order for the user receiver device 120 to obtain knowledge of the direction and/or pattern of the spot beams 110, the user receiver device 120 refers to a beam geometry database and/or an internal orbital model.

In FIG. 1A, the satellite 100 position information (i.e. the ephemerides) is transmitted to the user receiver device 120 from the satellite 100 itself. In some embodiments, the user receiver device 120 receives orbital data information and/or orbital delta correction information via transmissions from the satellite 100. In one or more embodiments, the user receiver device 120 calculates the satellite 100 position by using data from its internal orbital model and using orbital delta corrections that it receives from the satellite 100. In some embodiments, the calculation of the direction and/or pattern of the spot beams 110 is accomplished on-board the satellite 100. The direction and/or pattern information of the spot beams 110 may be transmitted from the satellite 100 to the user receiver device 120 as part of a message contained in the signal of the spot beams.

Alternatively, in FIG. 1B, the satellite 100 position information (i.e. the ephemerides) is transmitted to the user receiver device 120 over a cellular network 130. In other embodiments, various types of earth based networks, other than cellular networks, may be employed by the system of the present disclosure to transmit the satellite 100 position information (i.e. the ephemerides) to the user receiver device 120. In some embodiments, the user receiver device 120 receives orbital data information and/or orbital delta correction information via transmissions from the cellular network 130. In one or more embodiments, the user receiver device 120 calculates the satellite 100 position by using data from its internal orbital model and using orbital delta corrections that it receives from the cellular network 130.

In one or more embodiments, when the user receiver device 120 receives a signal from only one spot beam 110, the user receiver device 120 calculates the estimate of the location of the user receiver device 120 to be located at the center of the spot beam. Alternatively, when the user receiver device 120 receives a signal from two or more spot beams 110, the user receiver device 120 calculates the estimate of the location of the user receiver device 120 to be located at the center of the intersection 150 of the spot beams 110 that it receives a signal from. In other embodiments, when the user receiver device 120 receives a signal from two or more spot beams 110, the user receiver device 120 calculates the estimate of the location of the user receiver device 120 to be located at the centroid of the centers of the spot beams 110 that it receives a signal from. In at least one embodiment, the user receiver device 120 uses signal to noise (SNR) measurements that it receives from the satellite 100 in order to further refine its calculated estimate of its location. It should be noted that in some embodiments, the estimate of the location of the user receiver device 120 is used to provide an improvement in the accuracy of currently used geolocation algorithms. In addition, the estimate of the location of the user receiver device 120 may be used by a global positioning system (GPS) in order to assist in rapidly acquiring the GPS signal.

In some embodiments, the user receiver device 120 of FIGS. 1A and 1B includes at least one radio frequency (RF) antenna 140 that is used to receive a signal from at least one spot beam that is projected from the satellite 100. The RF antenna may be manufactured to be either internal or external to the housing of the user receiver device 120. In some embodiments, the user receiver device 120 also includes a processor that is used to calculate the estimate of the location of the user receiver device 120 according to the user receiver device's 120 location within at least one spot beam 110. In at least one embodiment, the user receiver device 120 further includes a local clock and a memory that is adapted to store successive spot beam identifying information that is recorded over time. In one or more embodiments, the user receiver device 120 is either mobile or stationary.

It should be noted that in one or more embodiments, the signal from each spot beam 110 comprises at least one acquisition channel. In some embodiments, at least one acquisition channel is an Iridium ring channel. For these embodiments, the user receiver device 120 may obtain, from the Iridium ring channel, the following information: the spot beam 110 ID number, the satellite's 100 X, Y, Z coordinates relative to an Earth coordinate system, and the time of the satellite's 100 clock by using the LBFC.

Figure 2:
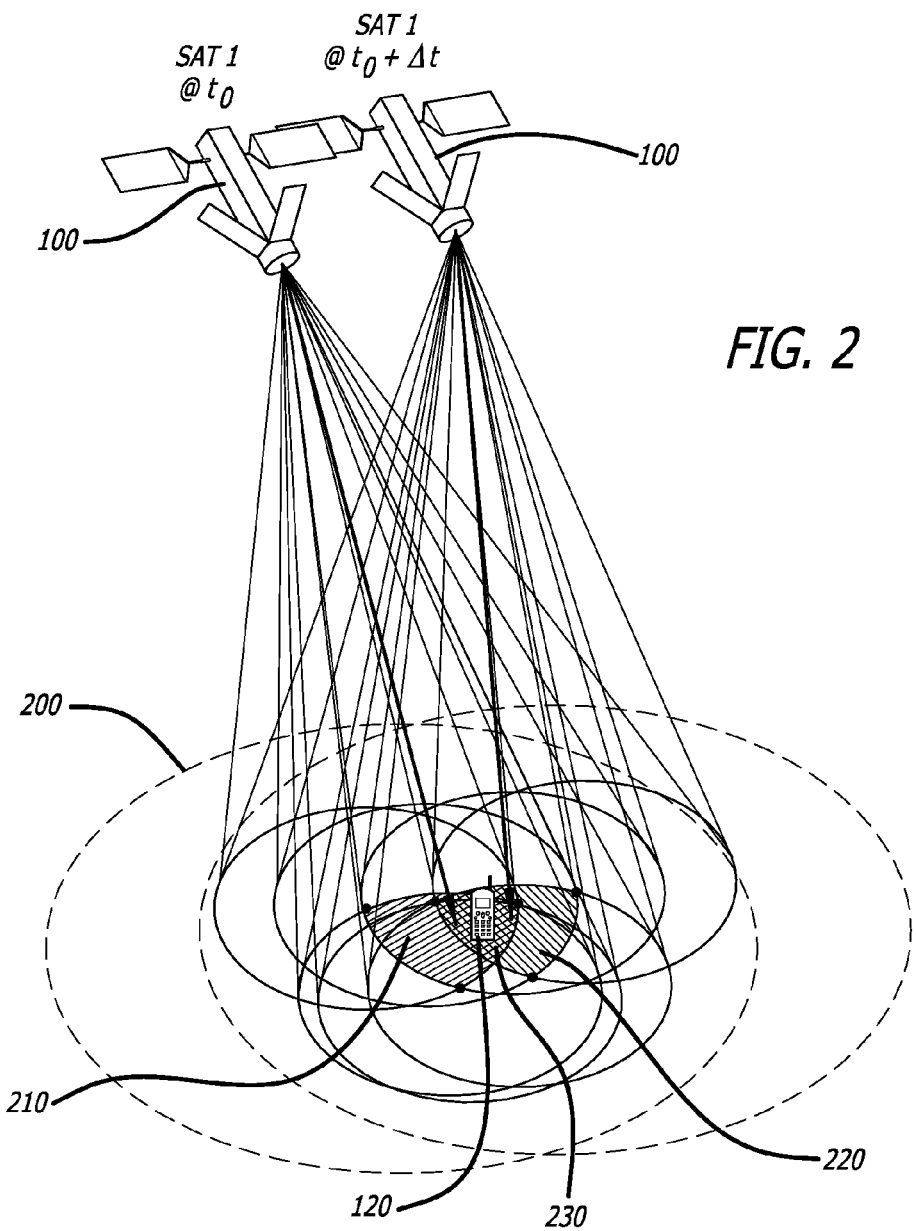
FIG. 2 depicts the use of a single satellite's overlapping multiple spot beams over time in order to obtain an estimate of the location of a user receiver device, in accordance with at least one embodiment of the present disclosure.

FIG. 2 depicts the use of a single satellite's 100 overlapping multiple spot beams over time in order to obtain an estimate of the location of a user receiver device 120, in accordance with at least one embodiment of the present disclosure. In this figure, it is shown that at time $t_0$, the user receiver device 120 is located within an intersection 210 of the spot beams 200 that are radiated by the SAT 1 satellite 100. It should be noted that in this figure the spot beams 200 that are being radiated by SAT 1 satellite 100 are fixed directional beams, not scanning beams. In one or more embodiments, the processor of the user receiver device 120 calculates a first estimate of the location of the user receiver device 120 to be located at the center of the intersection 210 of the spot beams 200. Then, the user receiver device 120 stores the locations of the spot beams 200 at time $t_0$ as well as stores this first estimate of the location of the user receiver device 120 in its memory.

As also shown in this figure, at a later time $t_0+\Delta t$, the spot beams 200 radiated from SAT 1 satellite 100 have swept across the surface of the Earth. As such, the user receiver device 120 is now located within a different intersection 220 of the spot beams 200 on the surface of the Earth. At this point in time, the processor of the user receiver device 120 calculates a second estimate of the location of the user receiver device 120 to be located at the center of the intersection 220 of the spot beams 200. The user receiver device 120 then stores the locations of the spot beams 200 at time $t_0+\Delta t$ as well as stores the second estimate of the location of the user receiver device 120 in its memory.

Once the user receiver device 120 obtains at least two estimates of the location of the user receiver device 120, the processor of the user receiver device 120 uses the estimates to calculate a further refined estimate of the location of the user receiver device 120. In this figure, it is shown that the processor of the user receiver device 120 calculated the refined estimate of the location of the user receiver device 120 to be in the center of the overlapping area 230 of the intersection 210 area and the intersection 220 area.

In one or more embodiments, the user receiver device 120 uses a beam averaging technique in order to obtain the further refined estimate. With this technique, the processor of the user receiver device 120 calculates the average of all of the stored estimates of the location of the user receiver device 120 in order to obtain a refined estimate. In some embodiments, the processor of the user receiver device 120 uses a Kalman filter in order to perform the beam averaging. In alternative embodiments, the processor of the user receiver device 120 uses a matched filter in order to perform the beam averaging.

Figure 3:
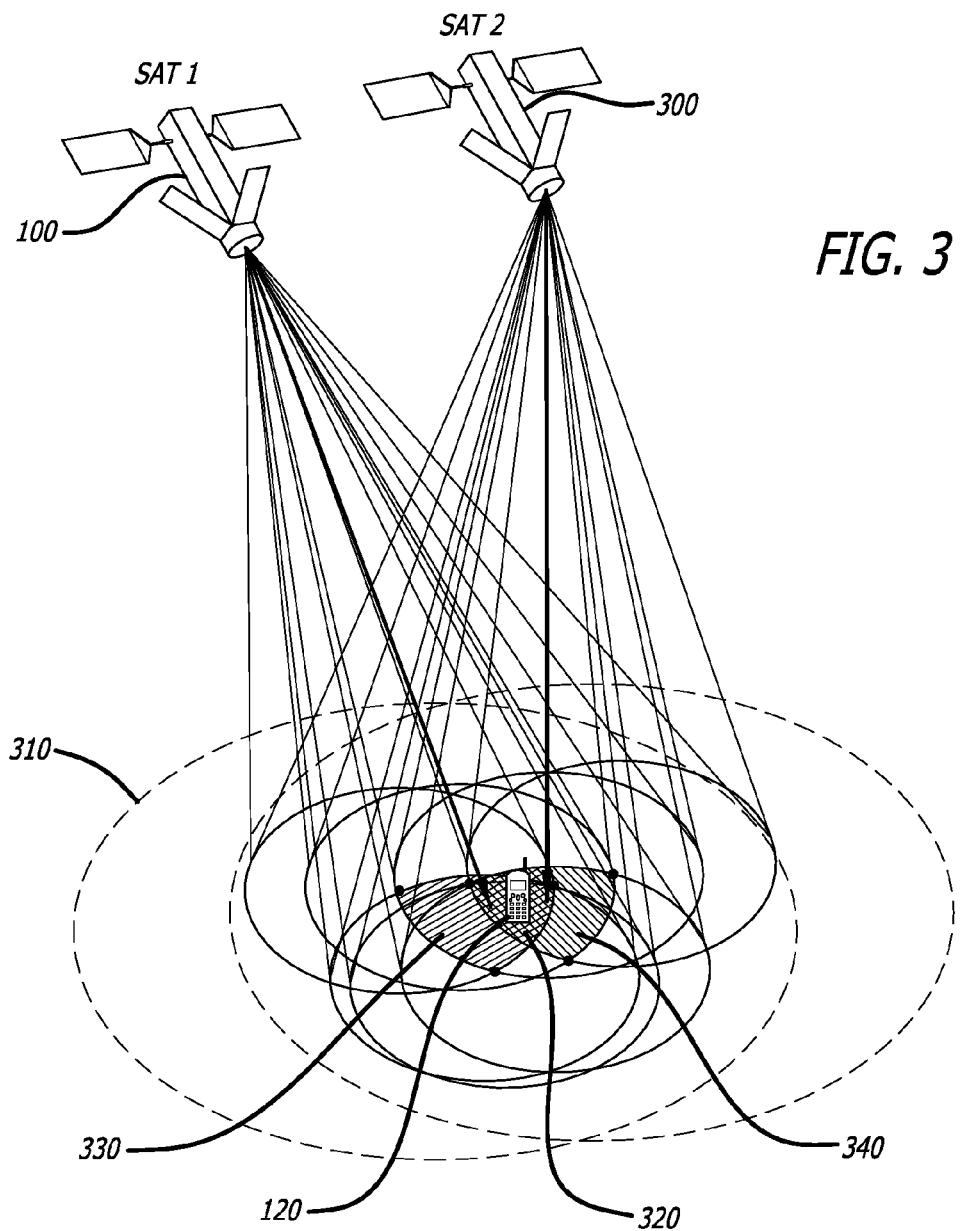
FIG. 3 illustrates the use of two satellites' overlapping multiple spot beams in order to obtain an estimate of the location of a user receiver device, in accordance with at least one embodiment of the present disclosure.

FIG. 3 illustrates the use of two satellites' overlapping multiple spot beams in order to obtain an estimate of the location of a user receiver device, in accordance with at least one embodiment of the present disclosure. In this figure, it is shown that at time $t_0$, the user receiver device 120 is located within an intersection 320 of the spot beams 310 that are radiated by the SAT 1 satellite 100 and the SAT 2 satellite 300. In this figure, the spot beams 310 that are being radiated by the SAT 1 satellite 100 and the SAT 2 satellite 300 are not scanning beams, but rather are fixed directional beams. In some embodiments, the processor of the user receiver device 120 calculates a first estimate of the location of the user receiver device 120 to be located at the center of the intersection 320 of the intersection 330 of the spot beams that are radiated by the SAT 1 satellite 100 and the intersection 340 of the spot beams that are radiated by the SAT 2 satellite 300. The user receiver device 120 then stores the locations of the spot beams 310 at time $t_0$ as well as stores this first estimate of the location of the user receiver device 120 in its memory.

In at least one embodiment, at time $t_0+\Delta t$, the spot beams 310 radiated from the SAT 1 satellite 100 and the SAT 2 satellite 300 have swept across the surface of the Earth. As such, the user receiver device 120 is now located within a different intersection of the intersection of the spot beams that are radiated by the SAT 1 satellite 100 and the intersection of the spot beams that are radiated by the SAT 2 satellite 300. At this point in time, the processor of the user receiver device 120 calculates a second estimate of the location of the user receiver device 120 to be located at the intersection of the intersection of the spot beams that are radiated by the SAT 1 satellite 100 and the intersection of the spot beams that are radiated by the SAT 2 satellite 300.

The user receiver device 120 then stores the locations of the spot beams 310 at time $t_0+\Delta t$ and stores the second estimate of the location of the user receiver device 120 in its memory. In some embodiments, the user receiver device 120 obtains a more refined estimate by using beam averaging. For the beam averaging, the processor of the user receiver device 120 determines the refined estimate by calculating the average of all of the stored estimates of the location of the user receiver device 120.

It should be noted that in alternative embodiments, the processor of the user receiver device 120 calculates the location of the user receiver device 120 to be located at the centroid of the centers of the spot beams that are radiated by the SAT 1 satellite 100 and the centers of the spot beams that are radiated by the SAT 2 satellite 300.

Figure 4:
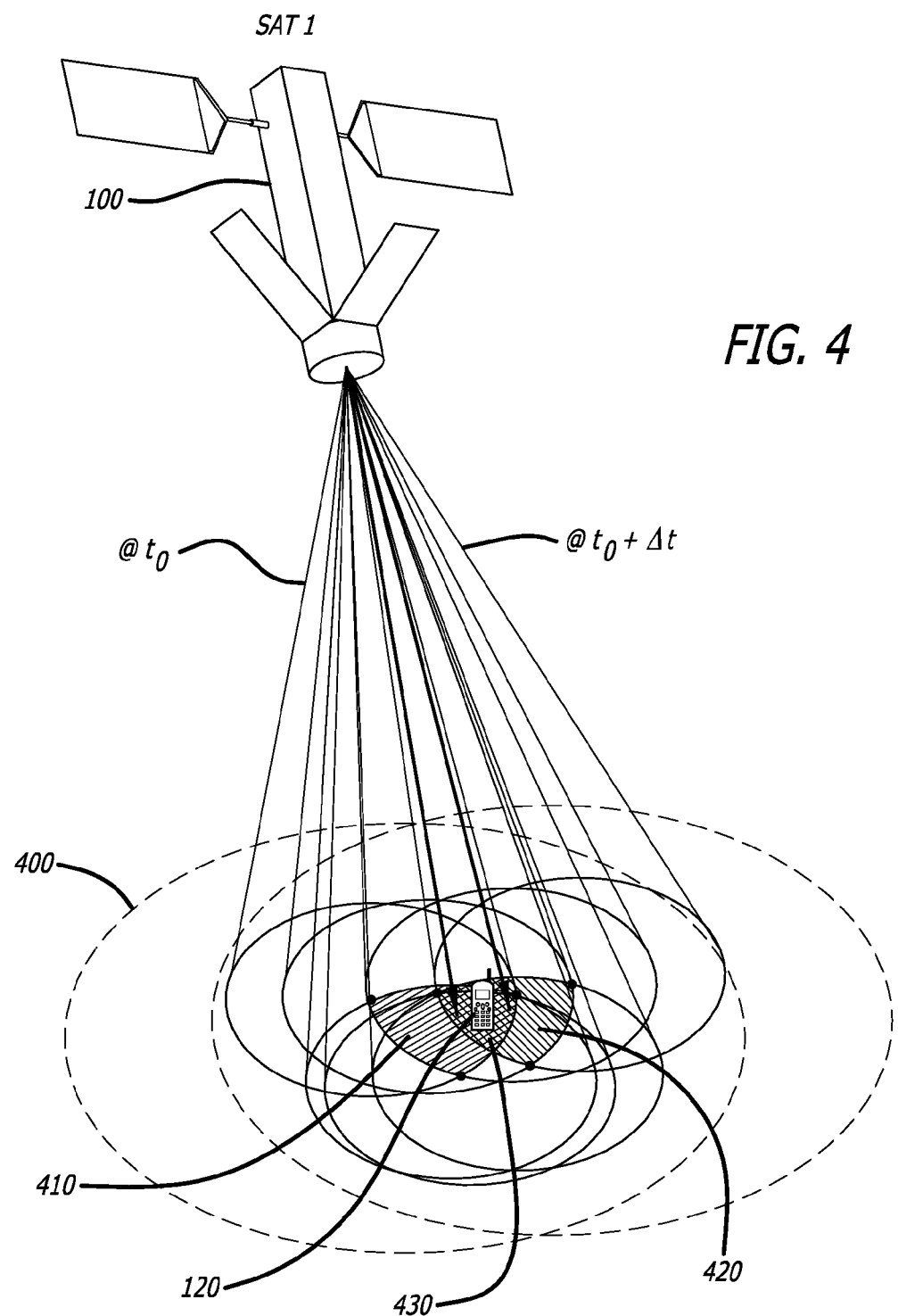
FIG. 4 shows the use of a single satellite's overlapping multiple spot beams that are scanned over time in order to obtain an estimate of the location of a user receiver device, in accordance with at least one embodiment of the present disclosure.

FIG. 4 shows the use of a single satellite's overlapping multiple spot beams that are scanned over time in order to obtain an estimate of the location of a user receiver device, in accordance with at least one embodiment of the present disclosure. In this figure, it is shown that at time $t_0$, the user receiver device 120 is located within an intersection 410 of the spot beams 400 that are radiated by the SAT 1 satellite 100. It should be noted that the spot beams 400 radiated by the SAT 1 satellite 100 are scanning beams, not fixed directional beams. As such, the scanning spot beams 400 are being swept across the surface of the Earth over time. The processor of the user receiver device 120 calculates a first estimate of the location of the user receiver device 120 to be located at the center of the intersection 410 of the spot beams 400 that are radiated by the SAT 1 satellite 100. Then, the user receiver device 120 stores the locations of the spot beams 400 at time $t_0$ as well as stores this first estimate of the location of the user receiver device 120 in its memory.

At time $t_0+\Delta t$, the scanning spot beams 400 radiated from the SAT 1 satellite 100 have swept across the surface of the Earth. The user receiver device 120 is now located within a different intersection 420 of the spot beams 400 on the surface of the Earth. At this time, the processor of the user receiver device 120 calculates a second estimate of the location of the user receiver device 120 to be located at the center of the intersection 420 of the spot beams 400. Then, the user receiver device 120 stores the locations of the spot beams 400 at time $t_0+\Delta t$ and stores the second estimate of the location of the user receiver device 120 in its memory.

After the user receiver device 120 obtains at least two estimates of the location of the user receiver device 120, the processor of the user receiver device 120 uses the estimates to calculate a refined estimate of the location of the user receiver device 120. The processor of the user receiver device 120 calculates the refined estimate of the location of the user receiver device 120 to be in the center of the overlapping area 430 of the intersection 410 area and the intersection 420 area.

In some embodiments, the user receiver device 120 uses beam averaging in order to calculate the further refined estimate. For this technique, the processor of the user receiver device 120 calculates the average of all of the stored estimates of the location of the user receiver device 120 in order to obtain the refined estimate.

Figure 5:
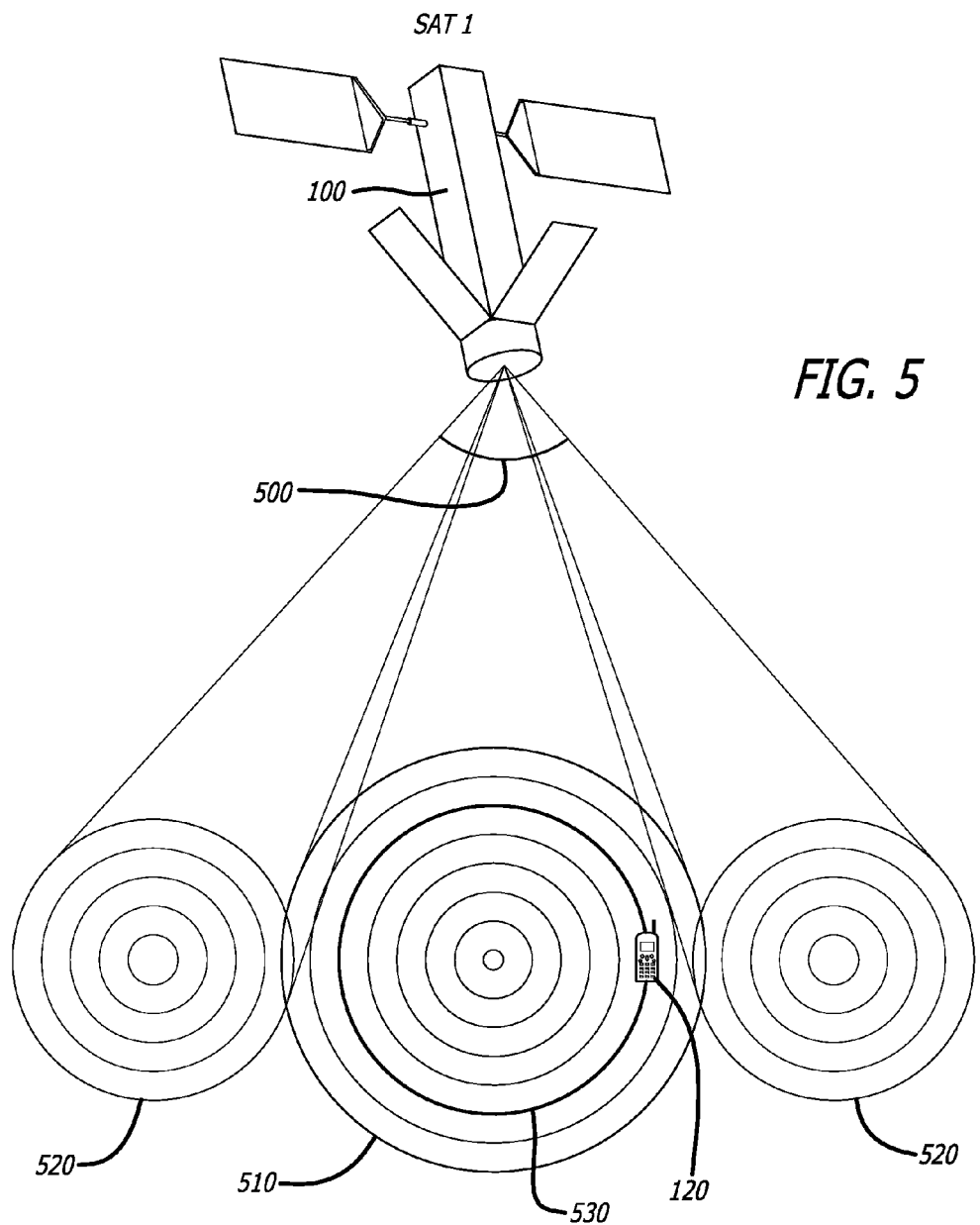
FIG. 5 depicts the use of a single satellite's signal amplitude that is received by the user receiver device in order to obtain an estimate of the location of a user receiver device, in accordance with at least one embodiment of the present disclosure.
Figure 6:
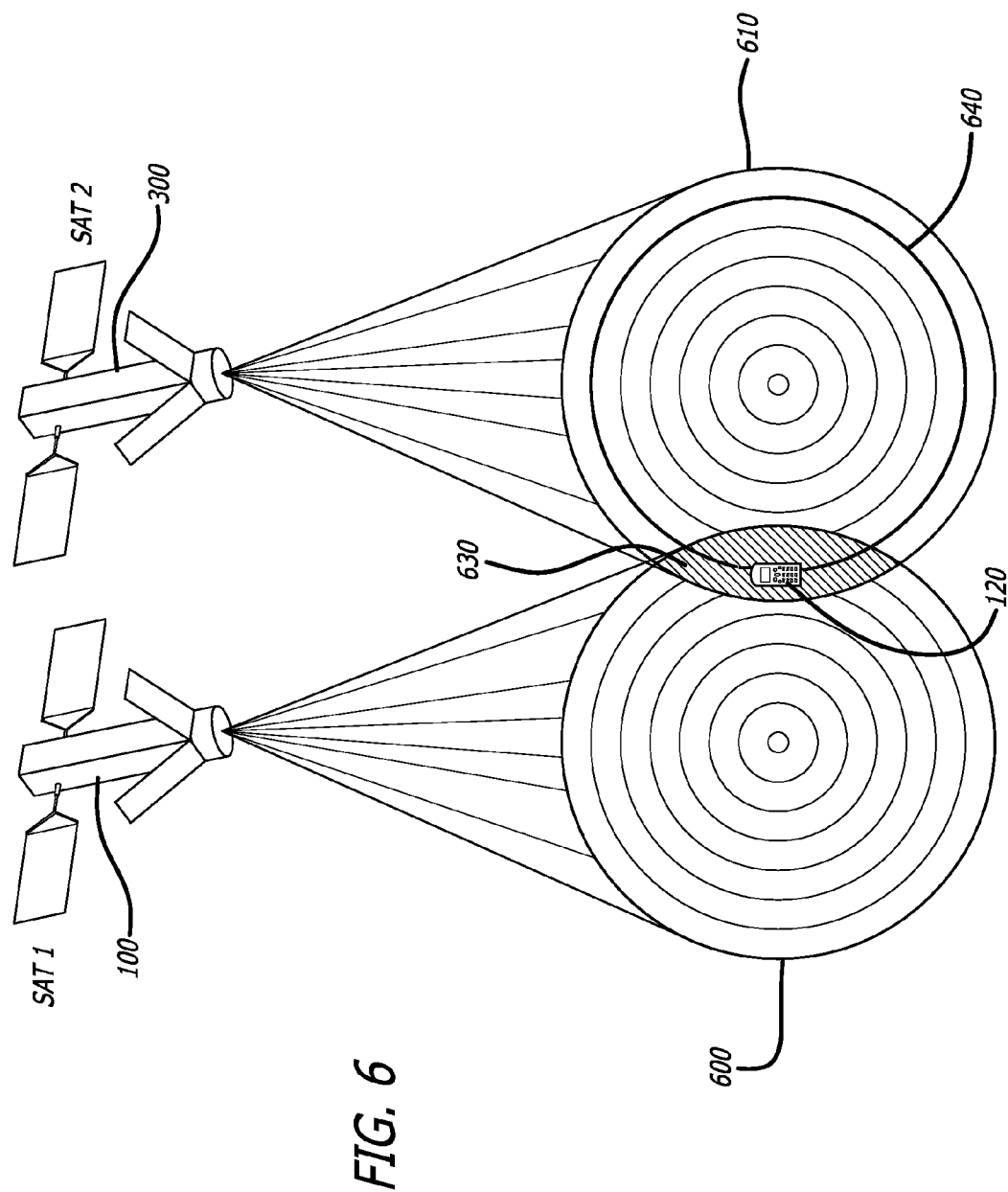
FIG. 6 shows the use of two satellites' signal amplitudes that are received by the user receiver device in order to obtain an estimate of the location of a user receiver device, in accordance with at least one embodiment of the present disclosure.
Figure 7:
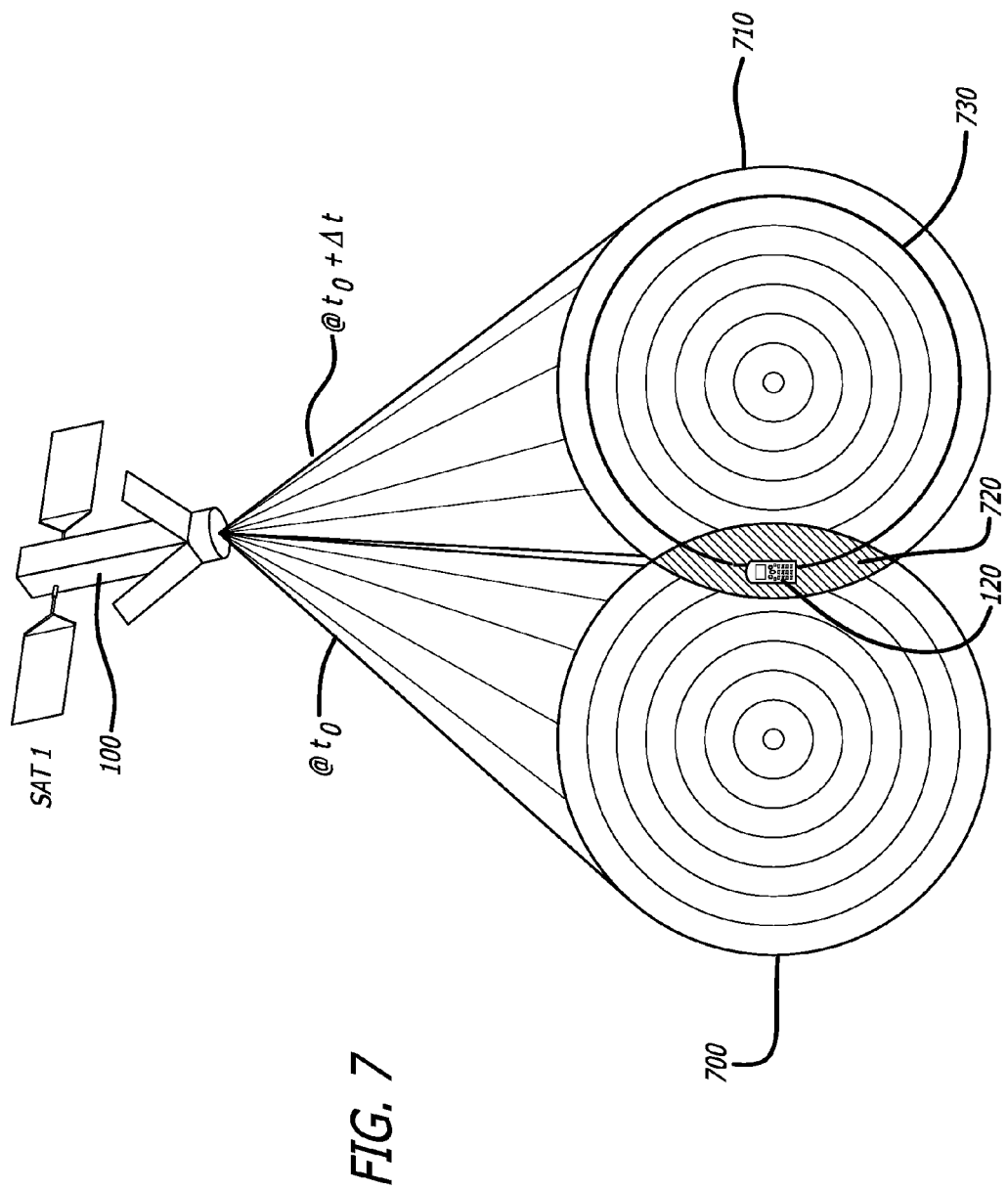
FIG. 7 illustrates the use of a single satellite's signal amplitude from a spot beam that is scanned over time in order to obtain an estimate of the location of a user receiver device, in accordance with at least one embodiment of the present disclosure.

FIGS. 5, 6, and 7 show various embodiments of the use of satellite signal amplitude in order to obtain an estimate of the location of a user receiver device, in accordance with multiple embodiments of the present disclosure. In particular, FIG. 5 depicts the use of a single satellite's signal amplitude that is received by the user receiver device in order to obtain an estimate of the location of a user receiver device, FIG. 6 shows the use of two satellites' signal amplitudes that are received by the user receiver device in order to obtain an estimate of the location of a user receiver device, and FIG. 7 illustrates the use of a single satellite's signal amplitude from a spot beam that is scanned over time in order to obtain an estimate of the location of a user receiver device.

In FIG. 5, the SAT 1 satellite 100 radiates one spot beam 110 on Earth. In this figure, the spot beam 500 is shown to have a main beam 510 and two side lobe beams 520. It should be noted that, for this figure, the spot beam 500 is a fixed directional beam, not a scanning beam. In this figure, the user receiver device 120 is shown to receive a signal from the radiated main beam 510. The processor of the user receiver device 120 uses the amplitude of the signal that it receives to calculate an estimate of its location on Earth according to its location within the signal amplitude contours 530 of the projected main beam 510. Once the user receiver device 120 obtains an estimate of its location, the user receiver device 120 stores the location of the spot beam 500 on Earth as well as stores its estimate of the location of the user receiver device 120 in its memory.

In FIG. 6, the SAT 1 satellite 100 and the SAT 2 satellite 300 are each shown to each be radiating one spot beam 600, 610, respectively, on Earth. In this figure, it is shown that the user receiver device 120 is located within an intersection 630 of the spot beam 600 that is radiated by the SAT 1 satellite 100 and the spot beam 610 that is radiated by the SAT 2 satellite 300. For this figure, spot beam 600 and spot beam 610 are a fixed directional beams, not a scanning beams. The processor of the user receiver device 120 uses the amplitude of the signal that it receives to calculate an estimate of its location within intersection 630 according to its location within the signal amplitude contours 640 of the projected spot beams 600, 610. After the user receiver device 120 obtains an estimate of its location, the user receiver device 120 stores the locations of the spot beam 600 and spot beam 610 as well as stores its estimate of the location of the user receiver device 120 in its memory.

In FIG. 7, at time $t_0$, the SAT 1 satellite 100 is shown to radiate a spot beam 700 on Earth. At this time, the user receiver device 120 is located within spot beam 700 that is being radiated by the SAT 1 satellite 100. It should be noted that the spot beam 700 radiated by the SAT 1 satellite 100 is a scanning beam, not a fixed directional beam. Thus, as spot beam 700 is being scanned over time, it is being swept across the surface of the Earth. The processor of the user receiver device 120 uses the amplitude of the signal that it receives to calculate a first estimate of its location within spot beam 700 according to its location within the signal amplitude contours of spot beam 700. The user receiver device 120 then stores the location of the spot beam 700 at time $t_o$ as well as stores the first estimate of the location of the user receiver device 120 in its memory.

Also in FIG. 7, at time $t_0+\Delta t$, the spot beam 700 radiated from the SAT 1 satellite 100 is shown to have swept across the surface of the Earth (now shown as spot beam 710). The user receiver device 120 is now located within spot beam 710. At this time, the processor of the user receiver device 120 uses the amplitude of the signal that it receives to calculate a second estimate of its location within spot beam 710 according to its location within the signal amplitude contours of spot beam 710. Then, the user receiver device 120 stores the location of the spot beam 710 at time $t_0+\Delta t$ and stores the second estimate of the location of the user receiver device 120 in its memory.

Once the user receiver device 120 obtains at least two estimates of the location of the user receiver device 120, the processor of the user receiver device 120 uses the estimates to calculate a further refined estimate of the location of the user receiver device 120. The processor of the user receiver device 120 uses beam averaging to calculate the further refined estimate of the location of the user receiver device 120 to be within the overlapping area 720 of spot beam 700 and spot beam 710. In addition, the processor obtains an even further refined estimate of the location of the user receiver device 120 by using the amplitude of the signal that it receives to calculate its location within the overlapping area 720 according to its location within the signal amplitude contours 730 of spot beams 700 and 710.

Figure 8:
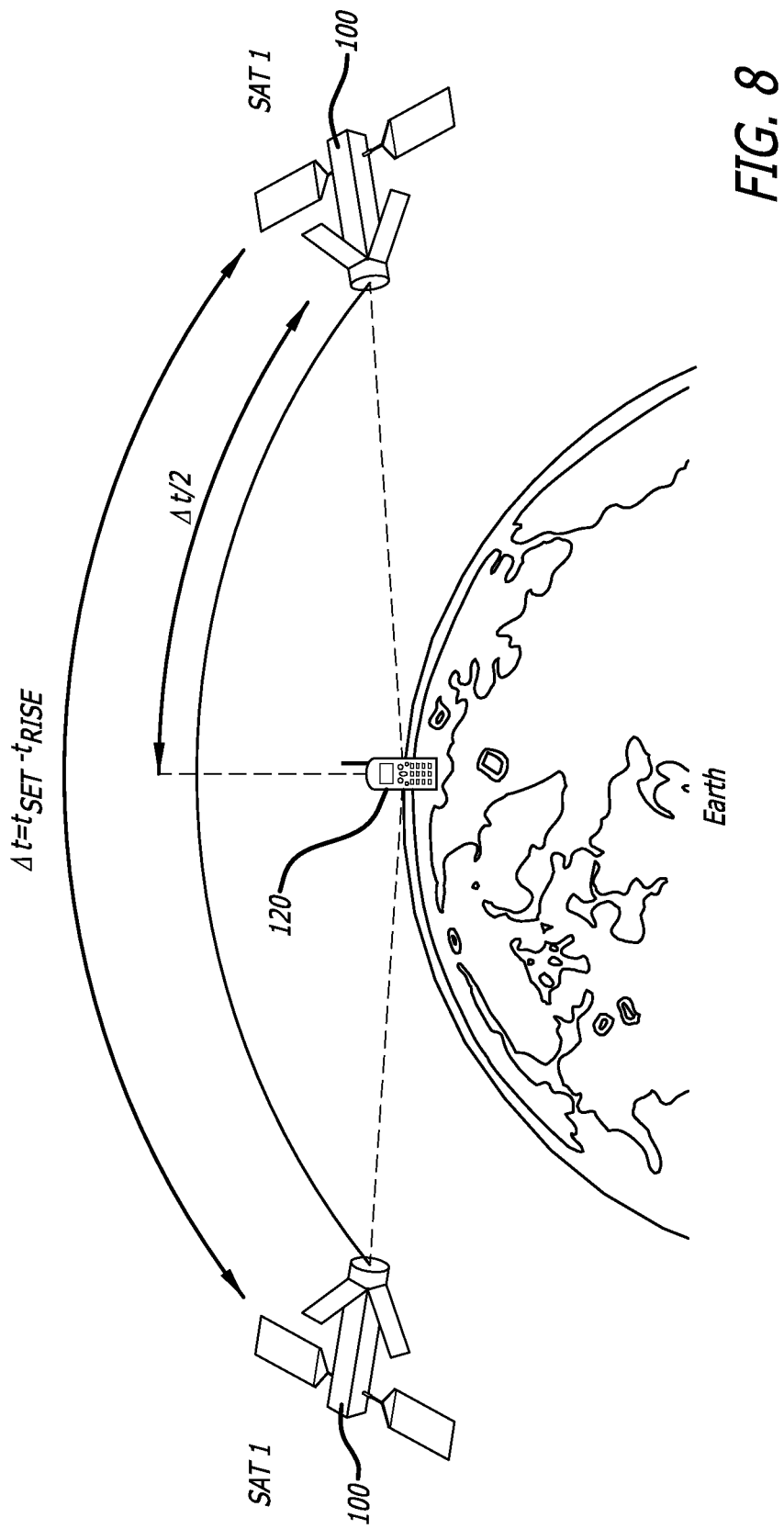
FIG. 8 is a pictorial representation of using a single satellite's spot beam's rising and setting times to estimate the location of a user receiver device for a uniform masking angle, in accordance with at least one embodiment of the present disclosure.

FIG. 8 is a pictorial representation of using a single satellite's 100 spot beam's rising and setting times to estimate the location of a user receiver device 120 for a uniform masking angle, in accordance with at least one embodiment of the present disclosure. In this figure, a spot beam's rising and setting times are used to obtain an estimate of the user receiver device's 120 location. For these embodiments, all of the spot beam's positions are recorded from the time the spot beam rises ($t_{RISE}$) to the time the spot beam sets ($t_{SET}$). Assuming uniform elevation mask angles in all directions with respect to the user receiver device 120, at time=$((t_{SET}-t_{RISE})/2)$, the user receiver device is assumed to be located at the center of the spot beam in the in-track direction.

It should be noted that the in-track direction is defined as the direction of motion of the satellite passing overhead the user receiver device 120. For the in-track direction coordinate frame, the origin is located at the location of the user receiver device 120, the x-axis is in the direction of motion of the satellite passing overhead the user receiver device 120, the z-axis is in the direction towards the center of the Earth, and the y-axis completes the right-handed Cartesian coordinate frame.

Figure 9A:
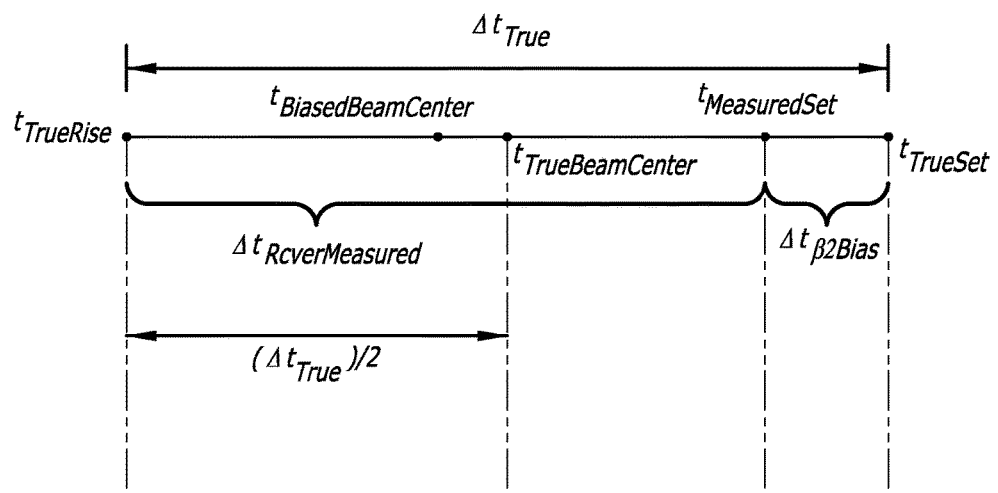
FIG. 9A shows an illustration of using a single spot beam's rising and setting times to estimate the location of a user receiver device for a non-uniform masking angle, in accordance with at least one embodiment of the present disclosure.
Figure 9B:
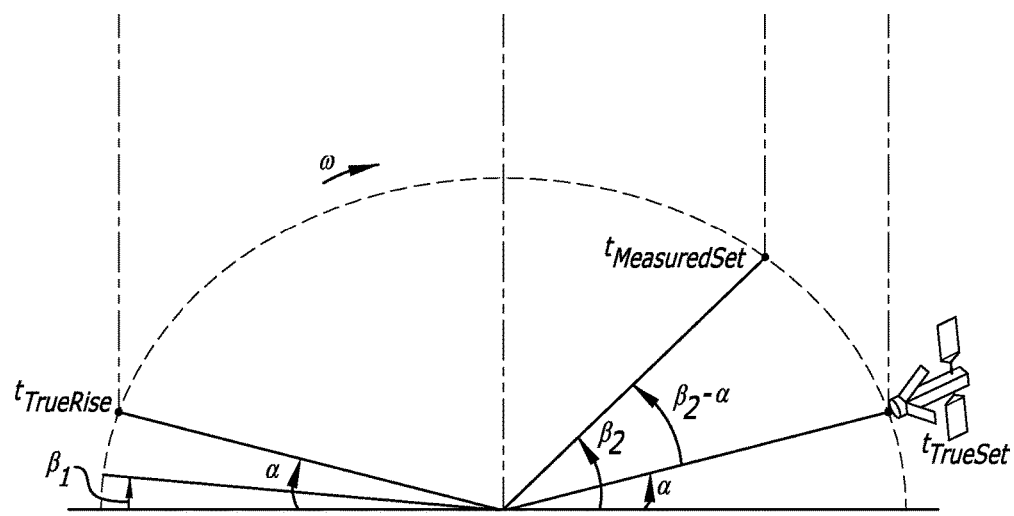
FIG. 9B shows a pictorial representation of using a single satellite's spot beam's rising and setting times to estimate the location of a user receiver device for a non-uniform masking angle, in accordance with at least one embodiment of the present disclosure.

FIG. 9A shows an illustration of using a single spot beam's rising and setting times to estimate the location of a user receiver device for a non-uniform masking angle, in accordance with at least one embodiment of the present disclosure. And, FIG. 9B shows a pictorial representation of using a single satellite's spot beam's rising and setting times to estimate the location of a user receiver device for a non-uniform masking angle, in accordance with at least one embodiment of the present disclosure. For these figures, since the beam pattern for the satellite constellation that passes over the user receiver device is in a known direction (e.g., North to South), only the masking angles in those directions (e.g., North and South) would be pertinent because the first direction (e.g., North) is the direction in which the satellite rises and the second direction (e.g., South) is the direction in which the satellite sets.

For these embodiments, $\alpha$ represents the constellation masking angle; $\beta_1$ is the masking angle that is associated with a possible obstruction that is blocking the user receiver device's line of sight to the satellite in the direction in which the satellite rises; and $\beta_2$ is the masking angle that is associated with a possible obstruction that is blocking the user receiver device's line of sight to the satellite in the direction in which the satellite sets. Bias is introduced when either or both β angle(s)>α. The uniform mask angle case as discussed in FIG. 8 occurs when $β_1=β_2=α$ or $β_1=β_2≠α$. For these embodiments, the β angles are either known or are estimated. FIGS. 9A and 9B show a specific case where there is an obstruction causing $β_2$ to be greater than the masking angle, α. When there is a small obstruction in the satellite's rise direction, $β_1<α$ and, thus, the obstruction does not impact the user receiver device's line of sight with the satellite. Therefore, the obstruction is negligible. It should be noted that similar variations exist for an obstruction in the satellite's rising direction where $β_1>α$. Assuming a non-uniform elevation in the direction in which the satellite rises and in the direction in which the satellite sets, it may be assumed that at time $(Δt_{True})/2$, where $(Δt_{True})/2 = (Δt_{RcverMeasured} + Δt_{β2Bias})/2$, the user receiver device is located at the center of the spot beam projection in the in-track direction.

FIG. 10 provides a flow diagram 1000 illustrating a method of obtaining a running estimate of the range between a user receiver device and a satellite, in accordance with at least one embodiment of the present disclosure. In this figure, a user receiver device receives the satellite ephemerides data from a low-earth orbit (LEO) satellite 1010. It should be noted that in other various embodiments, different types of satellites other than LEO satellites may be employed by the disclosed method.

After the user receiver device receives the ephemerides data, the processor of the user receiver device derives the instantaneous satellite position, velocity, and acceleration 1020. After the user receiver device calculates those derivations, the user receiver device receives from the satellite initial spot beam identifiers of the radiated satellite spot beam 1030. After receiving spot beam identifiers from the satellite, the user receiver device logs in the user receiver device's memory the spot beam identifiers and spot beam centers for successive spot beams 1040.

Then, the processor of the user receiver device employs those logged spot beam identifiers and spot beam centers with a beam averaging technique in order to derive a running user receiver device position estimate 1050. The processor of the user receiver device then derives a running estimate of the user receiver device to satellite unit vector 1060. Next, the processor of the user receiver device measures the doppler frequency offset of the satellite 1070. Then, the processor of the user receiver device uses the doppler frequency offset to calculate a doppler range estimate 1080. In at least one embodiment, the user receiver device uses a Kalman filter to calculate the doppler range estimate. The user receiver device maintains a running estimate of the calculated user receiver device to satellite range 1090.

FIG. 11 shows a flow diagram 1100 illustrating another method of obtaining a running estimate of the range between a user receiver device and a satellite, in accordance with at least one embodiment of the present disclosure. As is shown in this figure, the steps of the method of FIG. 11 are similar to the steps of the method depicted in FIG. 10. However, unlike the method of FIG. 10, the disclosed method of FIG. 11 allows for the various steps to be executed in varying orders.

As previously mentioned above, in one or more embodiments, an acquisition channel, may be employed to provide a signal for each of the spot beams. The acquisition channel can be used to derive an estimate of the location of the user receiver device. In some embodiments, the ring channel of the Iridium Satellite system may be used for the acquisition channel. FIG. 12 illustrates a time interval 1200 that includes a simplex time slot (which supports an exemplary Iridium ring channel) and other time slots, in accordance with at least one embodiment of the present disclosure. As shown in FIG. 12, time interval 1200 spans approximately 90 milliseconds (ms) and includes: a simplex time slot spanning approximately 20.32 milliseconds, four uplink time slots UL1-UL4, and four downlink time slots DL1-DL4, each spanning approximately 8.28 milliseconds.

Communication channels may be implemented in a communication or satellite system (e.g., the Iridium satellite network) using a hybrid time division multiple access-frequency division multiple access (TDMA/FDMA) architecture based on time division duplexing (TDD) using a 90 millisecond frame (e.g., such as time interval 1200). A particular channel may be, for example, a specific FDMA frequency (e.g., carrier frequency band) and TDMA timeslot (e.g., one of the simplex, uplink, or downlink time slots shown in FIG. 12). Channels also may be reused, for example, in different geographic locations by implementing acceptable co-channel interference constraints or other channel de-confliction methods such as time multiplexing. Thus, a channel assignment may comprise both a frequency carrier and a time slot within a frame.

In one embodiment, the simplex time slot may include an acquisition channel, which may use a known frequency that is held constant globally so that users around the world can universally access the acquisition channel. The acquisition channel may be a downlink channel that is formatted using TDMA and that provides alerts to user devices, which may include what frequency to access in order to complete the user's call (e.g., for the embodiments employing the Iridium satellite network). The TDMA structure of the acquisition channel may allow multiple alerts to be sent in one frame, such as time interval 1200. Also, for example, other channels may support the user receiver devices (e.g., cell phones or other compact electronic devices) by providing information required to enable channel acquisition and hand-off.

The acquisition channel may be utilized similarly to provide channel acquisition and hand-off information to user equipment (e.g., cell phones or other compact electronic devices). In situations where this might be used in relation to critical assets under attack, if the acquisition channel were jammed, that could result in key assets being unavailable during a critical need. To mitigate such a situation, a secondary transmission on one or more frequencies (e.g., there are four available messaging channels on the Iridium satellite system) may be broadcast. In principle, secondary transmissions could be broadcast, for example, over the entire 10 MHz Iridium L-band frequency band (i.e. 1616 to 1626.5 MHz). Such broad-spectrum secondary transmissions may, for example, require a jammer to fan its power over the full 10 MHz spectrum in its attempt to jam the satellite system, and thus may reduce the jammer's potential for jamming.

FIG. 13 provides a table 1300 containing exemplary frequency allocation for the channels (e.g., the ring channel and the messaging channels) of the simplex time slot of FIG. 12, in accordance with at least one embodiment of the present disclosure. For this example embodiment, a twelve-frequency access band may be reserved for the simplex time slot channels (i.e. the acquisition channel and the messaging channels). These channels may be located in a globally allocated 500 kHz band between 1626.0 MHz and 1626.5 MHz. These frequency accesses may be used only for downlink signals, and may be the only frequencies that may be transmitted during the simplex time slot. As shown in table 1300 for the Iridium example, four messaging channels and one ring alert channel are available during the simplex time slot.

The four messaging channels, located on alternative frequencies along with the ring channel (i.e. the ring alert channel) in the simplex time slot, may be used for channel acquisition and transferring a precise absolute time in case the ring channel for some reason was unavailable (e.g., if the ring channel were being jammed). The messaging channels for Iridium (as shown in table 1300) are channels 3, 4, 10, and 11, which are, respectively, the quaternary, tertiary, secondary, and primary messaging channels. Thus, in one embodiment, a satellite may transmit a data signal (e.g., ring message data including L-band frames, from which a precise absolute time is available for a user receiver device) on an acquisition channel (e.g., a ring channel for Iridium) and on messaging channels (e.g., on a time slot and frequencies) according to a known (a priori) or a predictable pattern that can be computed from a time parameter value (e.g., frequency hopping, TDMA/FDMA).

Specific information (e.g., a LBFC, a space vehicle identification (SVID), and X, Y, and Z position coordinates of the satellite) may be used to align a user receiver device's clock to acceptable accuracy to allow detection of a frequency (e.g., one of the messaging frequencies shown in table 1300) which may allow the user receiver device to gain access to use the system. It is possible that data used for acquisition (such as LBFC, SVID) in the absence of acquisition channel availability, may be located in its entirety in one alternate messaging channel. In some alternative embodiments, acquisition data also could be located in parts across multiple alternate messaging channels that, for example, have different encryptions. Such an embodiment may provide a useful implementation for further reducing unauthorized accessibility of the information, in general, or in case there was a concern that one encryption or both encryption methods could be at risk due to rogue users. For example, in a situation in need of high security, in one messaging channel, one portion of the acquisition data could be provided to the user receiver device via one encryption method and a second portion of the acquisition data could be provided via a second encryption method. Furthermore, the acquisition data could be nested in that additional security information may be accessed via one channel in order to access another channel.

FIG. 14 provides a flow diagram of a method 1400 for initiating a user receiver device for obtaining precise absolute time from a satellite by using the exemplary Iridium ring channel of FIG. 12, in accordance with at least one embodiment of the present disclosure. At the start 1405 of the method 1400, at block 1410, a user receiver device (e.g., such as any of the various user receiver devices described herein) may attempt to receive data over an acquisition channel from a satellite (e.g., a low earth orbiting (LEO) satellite, such as an Iridium satellite). The user receiver device may attempt to receive data in the form of a ring message (also referred to as "visit message") from the acquisition channel.

FIG. 15 shows an exemplary ring message 1500 contained in the simplex time slot of FIG. 12, in accordance with at least one embodiment of the present disclosure. As shown in this figure, a typical ring message 1500 (or visit message), when decoded, may contain information such as the following: LBFC=485215784, SVID=34, Beam ID=6, X Coordinate=127, Y Coordinate=−1140, and Z Coordinate=1102.

In this regard, the space vehicle identification (SVID) may be used to understand which satellite is relaying the information in the message 1500. The Beam ID (or spot beam identification (ID)) number may be used to identify which spot beam is sending the message 1500 for determining geolocation of the user receiver device. The X, Y, and Z coordinates are the coordinates for the satellite's position, and may be used to correct the time of flight of the signal from the space vehicle (e.g., the satellite) to the user receiver device. The X, Y, Z coordinates may also be used for geolocation of the user receiver device.

Regarding the LBFC number, Iridium burst sequences occur every 90 milliseconds in what is called an L-band frame (refer to FIG. 12). The LBFC number is effectively a clock with microsecond accuracy. The LBFC number may be, for example, a 32-bit number that counts the number of 90 millisecond frames from a known reference start time (e.g., also referred to as an "era"). For example, a start time of 12:00 A.M. on a certain date may be used. Because the edge of the L-band frame (and, thus, the LBFC) is accurate at the microsecond level, the ring message acts like, and can be used as, a very accurate clock that ticks every 90 milliseconds.

Referring back to FIG. 14, in block 1415, if the acquisition channel is available, then the user receiver device may receive the ring message data from the acquisition channel, and the method continues to block 1430. Otherwise, the method continues to block 1420.

In this regard, reliance on a known fixed frequency channel (e.g., the acquisition channel) as the only predictable location to find the key acquisition information described above can make any vital resources utilizing Iridium to support its applications more susceptible to interference. By putting this same key acquisition information on the above-described simplex time slot messaging channels, the user receiver device, as identified at block 1420, may attempt to receive (e.g., search among the alternative messaging channels) the channel acquisition data (e.g., ring message data) from one of the messaging channels (e.g., channels 3, 4, 10, 11 described above). By putting the ring message data on the simplex time slot messaging channels, the satellite system may spread out the jamming threat to multiple frequencies, and may also be able to increase the signal power by 9 decibels (dB), making the satellite system more robust with regard to jamming.

At block 1430, the user receiver device may receive the encrypted ring message data on one of the messaging channels (e.g., or over the acquisition channel if available as determined in block 1415). In various embodiments, the encoding of the ring message data may be specially encrypted for special users (e.g., the U.S. military).

For example, there may be several different ways to reformat the existing Iridium satellite system to give special users increased priority. One option, for example, may be through additionally expanding call precedence and priority levels to include more levels, assigning levels, e.g., quality of service (QoS) or level of service (LoS), or adding a levels-queuing methodology to the system. For example, calls for a critical application may be assigned a higher priority represented by a particular number, e.g., 4. In the case these calls were not able to access the acquisition channel, the call may have a back-up frequency of one or more of the four channels to access the required information from. In addition, subscriber identification module (SIM) cards or other similarly functioning devices may be programmed with a specific acquisition class as defined for the Iridium acquisition control scheme or the acquisition control scheme may be expanded to meet this special case. The signals for these special cases may be encrypted to add an additional layer of security. The encrypted ring message data may be decrypted and down-converted by the user receiver device at block 1440.

At block 1450, the user receiver device may use the decrypted ring message data to identify the satellite from which the ring message data is being received, and may use the position coordinate information in the ring message data to correct for time of flight of the signal between the satellite and the user receiver device. In order to obtain precise time, the user receiver device can use the L-Band Frame Count (LBFC) in the following equation.

$$\text{Time} = (Era + \text{LBFC}) * 90 \text{ ms} + \text{Time Bias} + (\text{Range}/C)$$

In the above equation, the "Era" may be based on a known date/time as defined for the system (e.g., the Iridium system) and which the user receiver device may have a priori knowledge. The "Time Bias" (or time slot offset) may represent any timing bias in the system, for example, and may compensate for measured errors in the clock of the satellite and/or known time slot changes in the transmission sequence. Time slots may be provided by the satellite, or they may be measured by a reference station, or they may be fixed or predictable as part of the service.

The "Range" represents the distance between the satellite and the user receiver device, and is computed using an orbit model for the satellite that may be delivered via data link, suitably accurate knowledge of the position of the user receiver device, and approximate time (as an input to a satellite orbit model). In one embodiment, to obtain an accuracy within about 10 microseconds, the range estimate must be accurate to about 3000 meters (m), which may equate to about 20,000 m of horizontal accuracy on the ground. This level of positioning may be easily achieved, for example, via cell network techniques. Additionally, simple beam coverage methods may be employed to determine the position of the user receiver device based on the knowledge of which satellite beam the user is presently located in and the recent beam time history. Numerous other methods of coarse positioning may also be suitably employed. In one embodiment, satellite orbit information (e.g., ephemeris) for the satellite includes information such as the location of the satellite within a constellation of satellites at various points in time and other information that can be used by the user receiver device to accurately obtain clock values from the satellite. In this embodiment, a network may easily determine the location of the user receiver device (or the user) within less than one kilometer. The range may be accurate to about 3 kilometers. The approximate time of the user receiver device may be used with the orbit information to determine the location of the satellite. After the range of the satellite is determined, it is then divided by the speed of light (also referred to as "C").

Each L-band frame is repeated (LBFC increments, 2.5 e.g., adds 1 to the count) every 90 milliseconds. The edge of the L-band frame (e.g., the instant in which the user receiver device receives the signal) may allow the user receiver device to maintain the accuracy of the user receiver device's time (e.g., align the user receiver device's local clock, at block 1460) to the microsecond level. The user receiver device first corrects for the time of flight of the signal, however, and in order to do so the user receiver device should know the satellite that is providing the data (SVID) as well as where that satellite is located in the sky (X, Y, and Z coordinates) in the appropriate coordinate system. Both of these pieces of information may be available in the ring message data, as described above. In addition, for enhanced accuracy, the user receiver device may have access to an orbit model for the satellite. The user receiver device may have the orbit model locally or the orbit model may be carried on a network, which the user receiver device may access to retrieve and process information as necessary. After the time of flight of the signal between the satellite and the user receiver device is corrected, the method 1400 ends 1470.

FIG. 16 depicts a block diagram 1600 illustrating various exemplary components employed by the disclosed user receiver device 1600, in accordance with at least one embodiment of the present disclosure. In this regard, user receiver device 1600 may be used to implement any of the various user receiver devices described herein. For example, in one embodiment, user receiver device 1600 may be used to implement a navigation device.

User receiver device 1600 may include an antenna 1610, a radio frequency (RF) front end and digitizer 1615, a processor 1620, a clock 1630, a memory 1640, and other components 1650.

Antenna 1610 may be implemented as one or more antennas used to send and/or receive signals in accordance with the various embodiments described herein.

RF front end and digitizer 1615 may include amplifiers, a radio frequency down converter, and analog to digital (ND) converter. RF front end and digitizer 1615 may process signals from antenna 1610 and provide information from the signals to processor 1620.

Processor 1620 may be implemented as one or more processors that may execute appropriate instructions (e.g., software) stored in one or more memories 1640 as well as in one or more non-transitory machine (or computer) readable media 1690 (or both). Clock 1630 (e.g., a user receiver device clock) may be a clock that may be aligned or operated in accordance with the various techniques described above.

Other components 1650 may be used to implement any other desired features of user receiver device 1600. It will be appreciated that, where appropriate, one or more satellites described herein may be implemented with the same, similar, or complementary components as those illustrated in FIG. 16.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method of providing an estimate of a location of a user receiver device, the method comprising:
    emitting, from at least one vehicle, a plurality of spot beams in a spot beam pattern that sweeps across a surface of Earth over time,
    wherein each of the spot beams within the plurality of spot beams comprises at least one acquisition signal;
    receiving, with the user receiver device, at least one of the spot beams within the plurality of spot beams as the plurality of spot beams sweeps across the surface of the Earth over time; and
    calculating, by the user receiver device using an amplitude of at least one of the spot beams in the plurality of spot beams received by the user receiver device, the estimate of the location of the user receiver device according to the user receiver device's location within signal amplitude contours of at least one of the spot beams in the plurality of spot beams received by the user receiver device.

2. The method of claim 1, wherein the at least one acquisition signal comprises at least one ring channel.

3. The method of claim 2, wherein the at least one ring channel comprises at least one of a frame count; a space vehicle identification (SVID); a spot beam identification (ID); and X, Y, Z coordinates of the at least one vehicle relative to an Earth coordinate system.

4. The method of claim 3, wherein the method further comprises calculating, by the user receiver device, a time from the at least one vehicle's clock by using the frame count.

5. The method of claim 4, wherein the method further comprises calculating, by the user receiver device, a range from the at least one vehicle to the user receiver device by using a difference between the time from the at least one vehicle's clock and a time from the user receiver device's clock.

6. The method of claim 5, wherein the method further comprises refining, by the user receiver device, the estimate of the location of the user receiver device by using the range and the X, Y, Z coordinates of the at least one vehicle.

7. The method of claim 1, wherein the at least one vehicle is at least one of a satellite, a pseudolite, a space shuttle, an aircraft, an airplane, an unmanned aerial vehicle (UAV), a balloon, and a helicopter.

8. The method of claim 7, wherein the at least one satellite is at least one of a low earth orbit (LEO) satellite, a medium earth orbit (MEO) satellite, and a geostationary earth orbit (GEO) satellite.

9. The method of claim 1, wherein the at least one spot beam is radiated as a fixed position beam.

10. The method of claim 1, wherein the at least one spot beam is radiated as a scanning beam.

11. The method of claim 1, wherein the user receiver device uses a processor to calculate the estimate of the location of the user receiver device.

12. A system for providing an estimate of a location of a user receiver device, the system comprising:
    at least one vehicle, wherein the at least one vehicle emits a plurality of spot beams in a spot beam pattern on Earth over time, and wherein each of the spot beams within the plurality of spot beams comprises at least one acquisition signal; and
    the user receiver device, wherein the user receiver device comprises:
        at least one radio frequency (RF) antenna, wherein the at least one RF antenna receives at least one of the spot beams within the plurality of spot beams as the plurality of spot beams sweeps across the surface of the Earth over time, and
        a processor, wherein the processor calculates, by using an amplitude of at least one of the spot beams in the plurality of spot beams received by the user receiver device, the estimate of the location of the user receiver device according to the user receiver device's location within signal amplitude contours of at least one of the spot beams in the plurality of spot beams received by the user receiver device.

13. The system of claim 12, wherein the at least one acquisition signal comprises at least one ring channel.

14. The system of claim 13, wherein the at least one ring channel comprises at least one of a frame count; a space vehicle identification (SVID); a spot beam identification (ID); and X, Y, Z coordinates of the at least one vehicle relative to an Earth coordinate system.

15. The method of claim 14, wherein the processor further calculates a time from the at least one vehicle's clock by using the frame count.

16. The system of claim 15, wherein the processor further calculates a range from the at least one vehicle to the user receiver device by using a difference between the time from the at least one vehicle's clock and a time from the user receiver device's clock.

17. The system of claim 16, wherein the processor further refines the estimate of the location of the user receiver device by using the range and the X, Y, Z coordinates of the at least one vehicle.

18. The system of claim 12, wherein the at least one vehicle is at least one of a satellite, a pseudolite, a space shuttle, an aircraft, an airplane, an unmanned aerial vehicle (UAV), a balloon, and a helicopter.

19. The system of claim 18, wherein the at least one satellite is at least one of a low earth orbit (LEO) satellite, a medium earth orbit (MEO) satellite, and a geostationary earth orbit (GEO) satellite.

20. The system of claim 12, wherein at least one of the spot beams in the plurality of spot beams is radiated as a fixed position beam.

21. The system of claim 12, wherein at least one of the spot beams in the plurality of spot beams is radiated as a scanning beam.

22. The system of claim 12, wherein the user receiver device further comprises:
    a local clock; and
    memory, wherein the memory is adapted to store successive spot beam identifying information that is recorded over time.

* * * * *